US010658886B2

(12) United States Patent
Flynn

(10) Patent No.: US 10,658,886 B2
(45) Date of Patent: May 19, 2020

(54) MAGNETICALLY ISOLATED PHASE INTERIOR PERMANENT MAGNET ELECTRICAL ROTATING MACHINE

(71) Applicant: QM Power, Inc., Kansas City, MO (US)

(72) Inventor: Charles J. Flynn, Greenwood, MO (US)

(73) Assignee: QM Power, Inc., Kansas City, MO (US)

(*) Notice: Subject to any disclaimer, the term of this patent is extended or adjusted under 35 U.S.C. 154(b) by 22 days.

(21) Appl. No.: 15/804,836

(22) Filed: Nov. 6, 2017

(65) Prior Publication Data

US 2018/0123407 A1 May 3, 2018

Related U.S. Application Data

(63) Continuation of application No. 13/348,632, filed on Jan. 11, 2012, now Pat. No. 9,812,908.

(60) Provisional application No. 61/431,779, filed on Jan. 11, 2011.

(51) Int. Cl.
*H02K 1/14* (2006.01)
*H02K 1/16* (2006.01)
*H02K 21/14* (2006.01)
*H02K 41/03* (2006.01)

(52) U.S. Cl.
CPC ........... *H02K 1/148* (2013.01); *H02K 1/16* (2013.01); *H02K 21/14* (2013.01); *H02K 41/031* (2013.01); *Y02E 10/725* (2013.01)

(58) Field of Classification Search
CPC .......... H02K 1/16; H02K 21/14; H02K 1/148; H02K 41/031; Y02E 10/725
See application file for complete search history.

(56) References Cited

U.S. PATENT DOCUMENTS

2008/0211336 A1* 9/2008 Sadarangani ........ H02K 41/031
310/156.02
2009/0236923 A1* 9/2009 Sakai ................... H02K 1/2766
310/156.43

* cited by examiner

*Primary Examiner* — Naishadh N Desai
(74) *Attorney, Agent, or Firm* — Polsinelli PC

(57) ABSTRACT

A rotor for a machine includes a plurality of rotor segments, each rotor segment forming a rotor pole and having two permanent magnets interior to the rotor to direct magnetic flux from the permanent magnets through one rotor pole of one rotor segment, through an air gap of a rotor-stator interface between the rotor and the stator, and through a stator pole, wherein at least one rotor segment comprises a saturatable bridge section comprising a structural arch to cause permanent magnet flux from at least one rotor permanent magnet to traverse through an air region of the rotor to core material of the rotor.

19 Claims, 18 Drawing Sheets

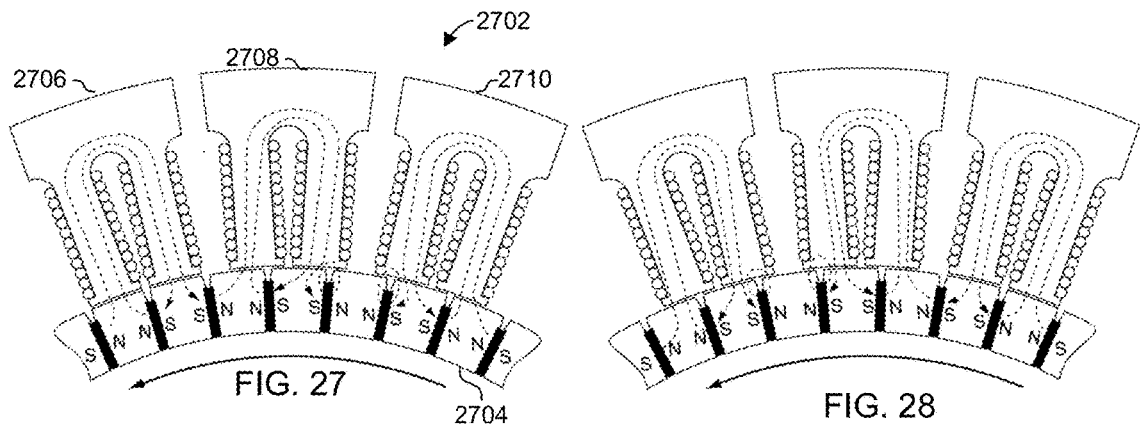
FIG. 27
FIG. 28
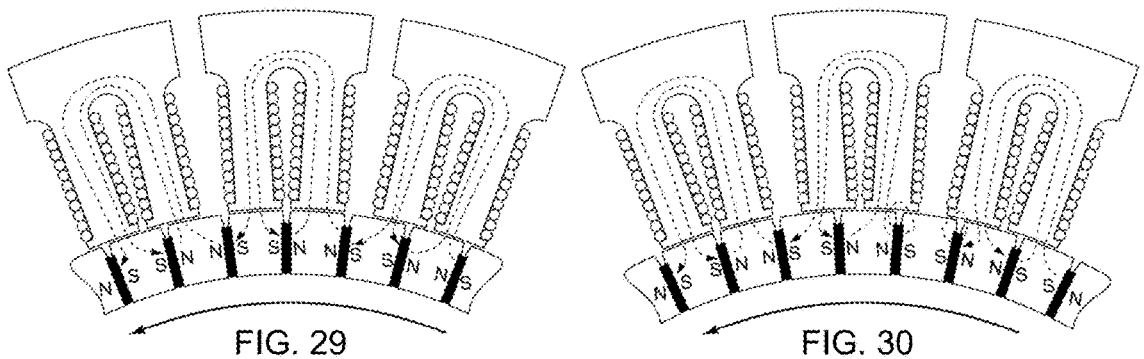
FIG. 29
FIG. 30
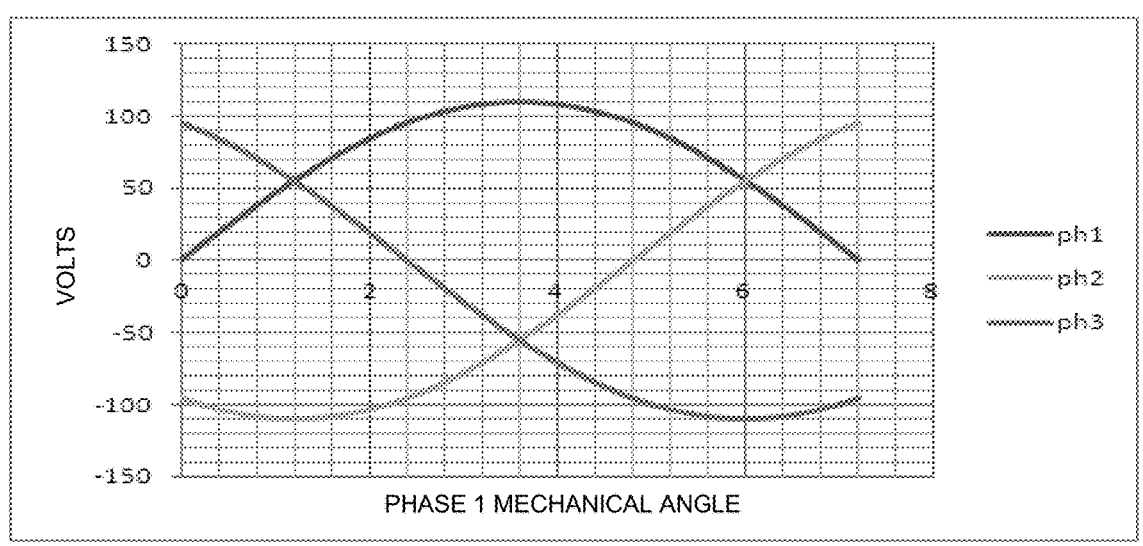
FIG. 31

MAGNETICALLY ISOLATED PHASE INTERIOR PERMANENT MAGNET ELECTRICAL ROTATING MACHINE

RELATED APPLICATIONS

This application is a continuation of U.S. application Ser. No. 13/348,632, filed Jan. 11, 2012, entitled Magnetically Isolated Phase Interior Permanent Magnet Electrical Rotating Machine, which takes priority to U.S. Application No. 61/431,779, filed Jan. 11, 2011, entitled Independent Phase Interior Permanent Magnet Generator, the entire contents of which are incorporated fully herein by reference. U.S. Patent Application Publication No. 2011/0089775, filed Oct. 19, 2010, entitled Parallel Magnetic Circuit Motor, is incorporated fully herein by reference.

FEDERALLY SPONSORED RESEARCH OR DEVELOPMENT

Not Applicable.

COMPACT DISK APPENDIX

Not Applicable.

BACKGROUND

In a conventional permanent magnet (PM) rotating machine having a rotor and stator, rotor magnets normally are mounted on the surface of the rotor back iron and produce an air gap flux density equal to the area of one of the permanent magnet's pole face area, as lowered by the air gap reluctance. Further, the magnets are located on the rotor in a manner where two permanent magnets face into three stator poles to accommodate a conventional three-phase lap wound motor/alternator or generator design. Since the flux from the permanent magnets in this conventional design is shared by three poles, the effect is diminished with regards to increasing the gap flux density. Further, if one pole in such a convention design is shorted, all three poles are shorted, which will cause the machine to lock. This does not provide for a fault tolerant design, and any imbalance on one of the phases will distort the other phases.

With the rising cost of rare earth permanent magnet materials, rotating machine designers are looking for solutions that will reduce the amount of rare earth material used without sacrificing power density. A conventional way of achieving this goal is to increase the number of stator teeth that produce torque over the 360 degrees [2 pi radians] they occupy.

One such machine topology is a single phase permanent magnet synchronous motor. A drawback with a single phase permanent magnet [PM] synchronous motor/generator is that all of the rotor and stator teeth come into and out of alignment at the same time or angular intervals, producing their minimum and maximum torque (motor) or power (generator) values at the same time. Therefore, the average power (mechanical power/torque or electrical power) is lower than the desired optimal torque or power.

A multiphase permanent magnet machine will produce a higher average torque or power since each phase will contribute to the torque or power at different angular intervals. However, a distributed or lap wound permanent magnet multiphase machine will have one or more stator teeth that do not produce torque or power over an angular interval since more than one tooth forms a stator pole. This lowers the number of torque or power producing teeth over 2 pi radians. In addition, the phases in a permanent magnet distributed or lap wound multiphase machine share the same flux sources (i.e. the permanent magnets), which limits the amount of available energy stored in the magnetic field for a given phase since this energy is shared by all of the machine's phases. A concentrated wound multiphase machine increases the number of teeth producing torque or power but does not address the problem with the phases sharing the same flux source (i.e. the permanent magnets).

SUMMARY

In one aspect, a rotor for a machine comprises a plurality of rotor segments, each rotor segment forming a rotor pole and having two permanent magnets interior to the rotor to direct magnetic flux from the permanent magnets through one rotor pole of one rotor segment, through an air gap of a rotor-stator interface between the rotor and the stator, and through a stator pole, wherein at least one rotor segment comprises a saturatable bridge section comprising a structural arch to cause permanent magnet flux from at least one rotor permanent magnet to traverse through an air region of the rotor to core material of the rotor.

In another aspect, a system includes a stator for a machine having a plurality of electrical phases, the stator comprising at least one stator phase section with at least two stator teeth and at least one winding slot having an angular distance between the at least two stator teeth and at least one magnetically inactive isolation region. The system includes a rotor comprising a plurality of rotor segments, each rotor segment forming a rotor pole and having two permanent magnets interior to the rotor to direct magnetic flux from the permanent magnets through one rotor pole of one rotor segment, through an air gap of a rotor-stator interface between the rotor and the stator, and through a stator pole, wherein at least one rotor segment comprises a saturatable bridge section to cause permanent magnet flux from at least one rotor permanent magnet to traverse through an air region of the rotor to core material of the rotor.

In another aspect, a magnetically isolated phase stator has a stator phase section with two sides and an isolation region on each side that is magnetically inactive. The stator phase section has two or more stator teeth defining stator poles, a winding slot between the stator teeth, and a phase winding wound about each stator tooth.

In another aspect, another magnetically isolated phase stator has two or more stator phase sections that are magnetically isolated from each other by at least one isolation region. The isolation region is a magnetically inactive region or area. Each stator phase section has two or more stator teeth defining stator poles with a winding slot between the stator teeth and a phase winding wound about each stator tooth. The phase winding is a concentrated winding in one aspect.

In another aspect, a magnetically isolated phase interior permanent magnet electrical rotating machine includes a magnetically isolated phase stator, a rotor, and an air gap between the stator and rotor defining a rotor-stator interface. The rotor has two or multiples of two permanent magnets arranged with opposing magnetic poles (e.g. a north pole of a magnet facing a north pole of another magnet or a south pole of a magnet facing a south pole of another magnet), which is referred to herein as a parallel arrangement. The opposing magnetic poles of the permanent magnets in the rotor direct magnetic flux through a pole of the rotor, through the air gap of the rotor-stator interface, and through a pole of the stator.

BRIEF DESCRIPTION OF THE DRAWINGS

FIGS. 27-30 are diagrams of a generator operation.

FIGS. 31-32 are graphs of voltage in a generator operation.

DETAILED DESCRIPTION

A magnetically isolated phase stator of the present disclosure has two or more stator phase sections (also referred to as sectors) that are magnetically isolated from each other by at least one isolation region. An isolation region is a magnetically inactive region or area, such as one or more apertures and/or one or more areas with magnetically inactive material. Each stator phase section has two or more stator teeth defining stator poles with a winding slot between the stator teeth and a concentrated phase winding wound about each stator tooth.

A magnetically isolated phase interior permanent magnet electrical rotating machine (MIP-IPM-ERM) includes the above-described stator, a rotor, and an air gap between the stator and rotor defining a rotor-stator interface. The rotor has two or multiples of two permanent magnets arranged with opposing magnetic poles (e.g. a north pole of a magnet facing a north pole of another magnet or a south pole of a magnet facing a south pole of another magnet), which is referred to herein as a parallel arrangement. The opposing magnetic fields of the permanent magnets in the rotor direct magnetic flux through a pole of the rotor, through the air gap of the rotor-stator interface, and through a pole of the stator. The machine may be configured, for example, as a motor or a generator. A motor may be configured, for example, as a hub motor or other motor. In another example, the machine is a wind generator or wind turbine.

The MIP-IPM-ERM has the highest rotor to stator active area (a ratio of stator poles to rotor poles) for a multiphase permanent magnet machine, which is very desirable. The rotor to stator active area of this machine approaches that of a single phase permanent magnet synchronous rotating machine and equally addresses the problems with the phases sharing the same flux source by magnetically isolating each of the phases. That is, if one pole of a phase section or an entire phase section is shorted, the other phase sections are not shorted and will continue to operate. This provides a fault tolerant design. Moreover, any imbalance in one of the phase sections will not distort the other phase sections. When compared to a conventional interior permanent magnet machine, the MIP-IPM-ERM uses fifty-percent less rare earth permanent magnet material with a thirty-percent increase in power density, where both machines have the same exterior dimensions or volume.

Figure 1:
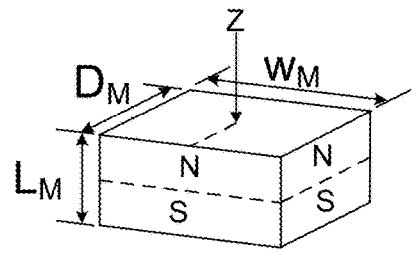
FIG. 1 is a diagram of dimensions of a rectangular permanent magnet.

FIG. 1 depicts dimensions of a rectangular permanent magnet, which include its length ($L_M$), width ($W_M$), and depth ($D_M$). Equation 1 illustrates a hyperbolic function that relates the flux density produced by a permanent magnet to the permanent magnet's dimensions illustrated in FIG. 1.

$$B_{min} = \frac{\left(\frac{B_r}{\pi}\right) \cdot \left[ atan\left[\frac{Wm \cdot Dm}{(2 \cdot Z) \cdot \sqrt{Wm^2 + Dm^2 + 4 \cdot Z^2}}\right] - atan\left[\frac{Wm \cdot Dm}{2 \cdot (Z + Lm) \cdot \sqrt{Wm^2 + Dm^2 + 4 \cdot (z + Lm)^2}}\right] \right]}{10000} \qquad \text{Eq. 1}$$

The flux density (B) of a permanent magnet is governed by its pole face area, and the length between the poles produces the field intensity (H). The maximum flux density for a permanent magnet outside of a magnetic circuit is approximately equal to one-half the residual flux density (Br), and the maximum flux density for a permanent magnet in a circuit would be a circuit without an air gap where the flux density would be equal to Br. However, a permanent magnet that is in a circuit without an air gap has a field intensity close to zero. When a permanent magnet is used in a rotating machine, the flux density in the air gap provides the working field. Due to the reluctance in the air gap, the value of this flux density is between one-half and three-fourths of the Br.

Figure 2:
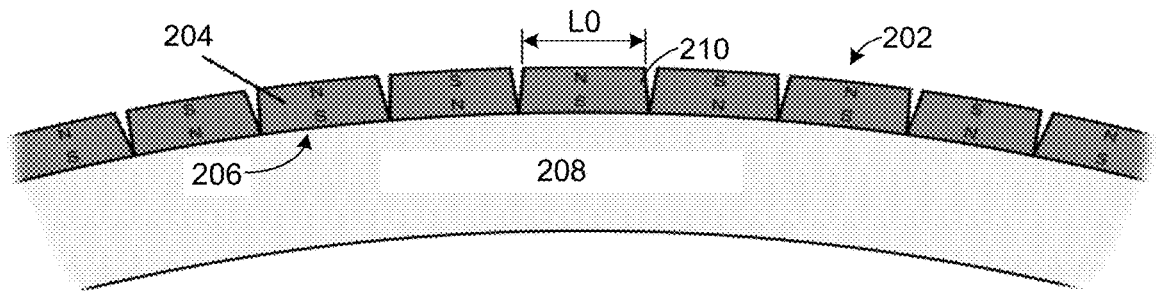
FIG. 2 is a diagram of magnets on a conventional rotor.

As shown in FIG. 2, the rotor 202 of some conventional motors has interior permanent magnets 204. However, the rotor magnets generally are mounted on the surface 206 of the rotor back iron 208 and produce an air gap flux density equal to the area of one of the permanent magnet's pole face area, as lowered by the air gap reluctance. Thus, the flux is limited by the pole face area of one permanent magnet 210 having a pole face length of L0 inches. Using a high grade neodymium permanent magnet, the air gap flux density is about 0.8 Tesla.

Figure 3:
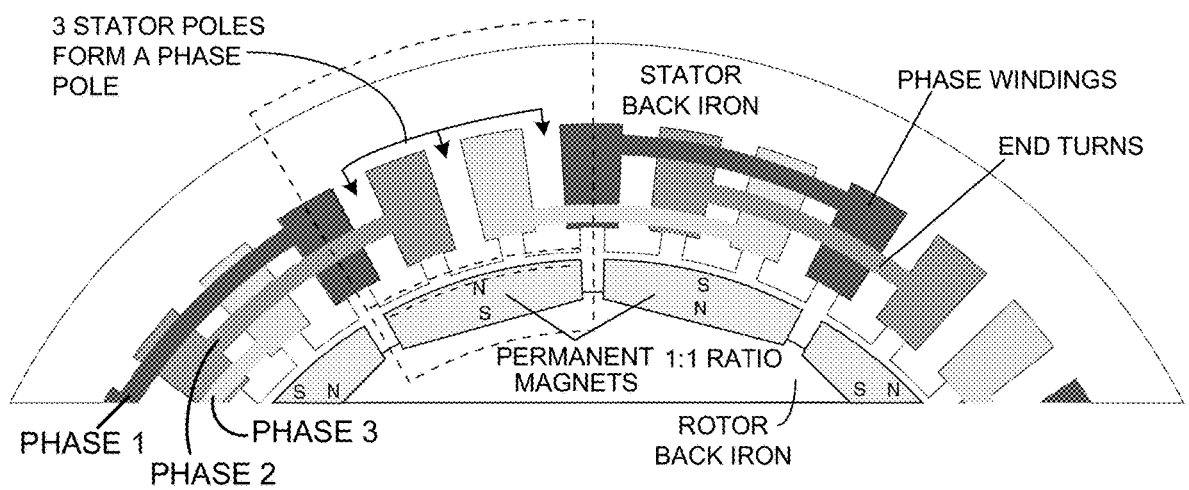
FIG. 3 is a diagram of a conventional rotor.

In addition, as shown in FIG. 3, the magnets are oriented in a manner where two permanent magnets face into three stator poles to accommodate a conventional three-phase lap wound design. Since the flux from the permanent magnets in this conventional design is shared by three poles, the effect is diminished with regards to increasing the gap flux density. Further, if one pole in such a convention design is shorted, all three poles are shorted, which could cause the machine to lock if the short was significant. This does not provide for a fault tolerant design. Any imbalance on one of the phases will distort the other phases.

The machine of the present disclosure overcomes limitations of diminished air gap flux density due to limitations of the permanent magnets pole face area. It also provides fault tolerance because one or more phases may operate when a phase or multiple phases become inoperable. Moreover, it provides phase balancing so that one phase will not distort another phase.

Figure 4:
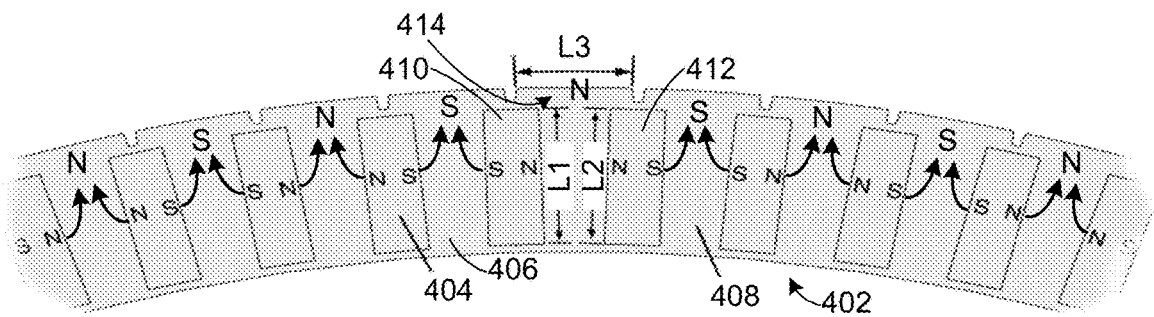
FIG. 4 is a diagram of magnets of a rotor in a parallel arrangement.

FIG. 4 depicts a portion of a rotor 402 of a MIP-IPM-ERM of the present disclosure having permanent magnets 404 mounted on the interior 406 of the rotor back iron 408. The flux from two permanent magnets 410 and 412 arranged in parallel combine to produce a flux density through a rotor pole 414 that is much greater than the flux produced through a rotor pole in a conventional permanent magnet (PM) rotating machine. In the machine of the present disclosure, the flux is produced by two permanent magnet pole faces with lengths of L1 inches and L2 inches each facing into a pole face that has a length of L3 inches. Thus, the two permanent magnets produce a flux of (L1+L2)/L3 through the rotor pole 414.

When, for example, the pole face of the magnet 210 in FIG. 2 has a length L0 of 0.262 inches, the lengths L1 and L2 of the pole faces of the magnets 410 and 412 in FIG. 4 both are 0.375", and the length L3 of the rotor pole 414 in FIG. 4 is 0.262", a "virtual" permanent magnet results in the rotor 402 of FIG. 4 that has a pole face area 2.86 times greater than a pole face area of a magnet 210 that could be mounted on the surface 206 of the rotor back iron 208 shown in FIG. 2.

Figure 5:
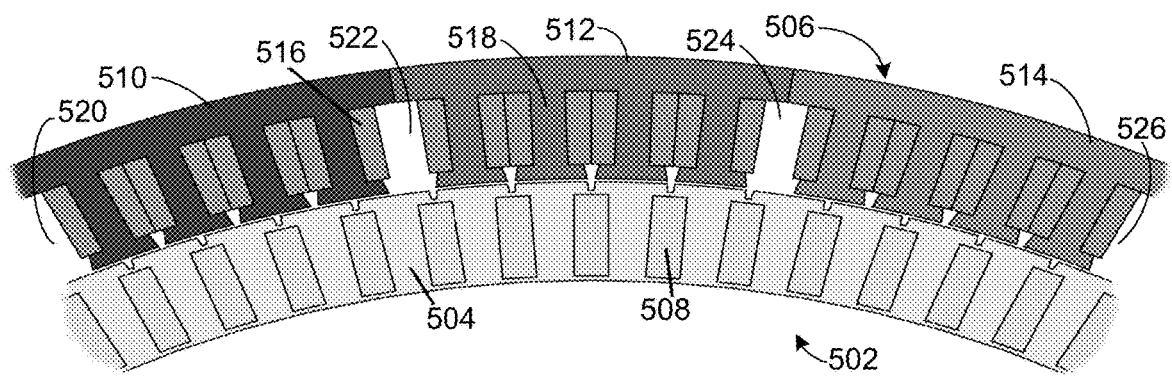
FIG. 5 is a diagram of a magnetically isolated phase interior permanent magnet electrical rotating machine.

FIG. 5 depicts a portion of a magnetically isolated phase interior permanent magnet electrical rotating machine 502 having a rotor 504 and a stator 506. The rotor 504 has interior mounted permanent magnets 508 arranged in parallel. The stator 506 has phase section A 510, phase section B 512, and phase section C 514, each with coils 516 wrapped around teeth 518.

Each of the stator's 506 phase sections 510-514 is isolated by magnetically isolating areas 520-524, such as stator isolation regions. That is, a stator phase section is magnetically isolated from another stator phase section by a magnetically isolating area, such as a stator isolation region.

An isolation region is a magnetically inactive region or area, such as one or more apertures, one or more areas with magnetically inactive material, and/or one or more other magnetically inactive areas. The magnetically inactive region prevents a permanent magnetic field from being shared between one stator phase section and another stator phase section. Thus, a given stator phase section does not share the flux of any rotor permanent magnet with another stator phase section. This prevents catastrophic third harmonic distortion if a stator phase section becomes unbalanced. Moreover, if a fault occurs in one stator phase section, it can simply be removed from the circuit without affecting the operation of the remaining stator phase sections, resulting in a fault tolerant machine. In the conventional lap wound machine, if a phase is short circuited, even if the output of that phase is removed from the circuit, the short in the faulted phase will continue to absorb energy from the air gap thereby reducing the amount of stored energy to the other phases and continuing to produce distortion in the remaining phases.

Figure 7:
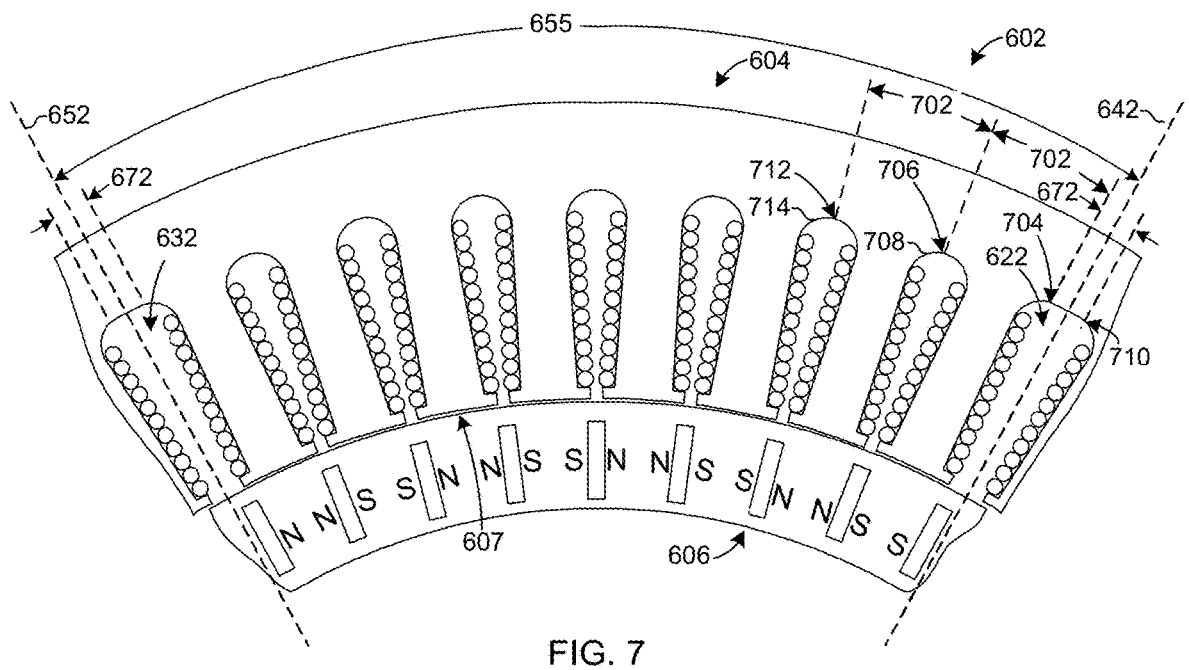
FIGS. 6-7 are diagrams of a magnetically isolated phase interior permanent magnet electrical rotating machine.
Figure 8:
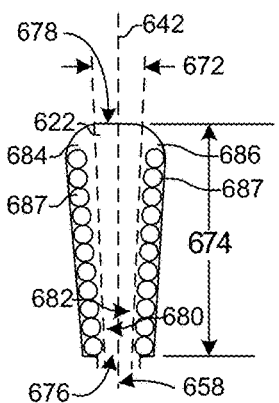
FIG. 8 is a diagram of an isolation region of the magnetically isolated phase interior permanent magnet electrical rotating machine of FIG. 6-7.
Figure 6:
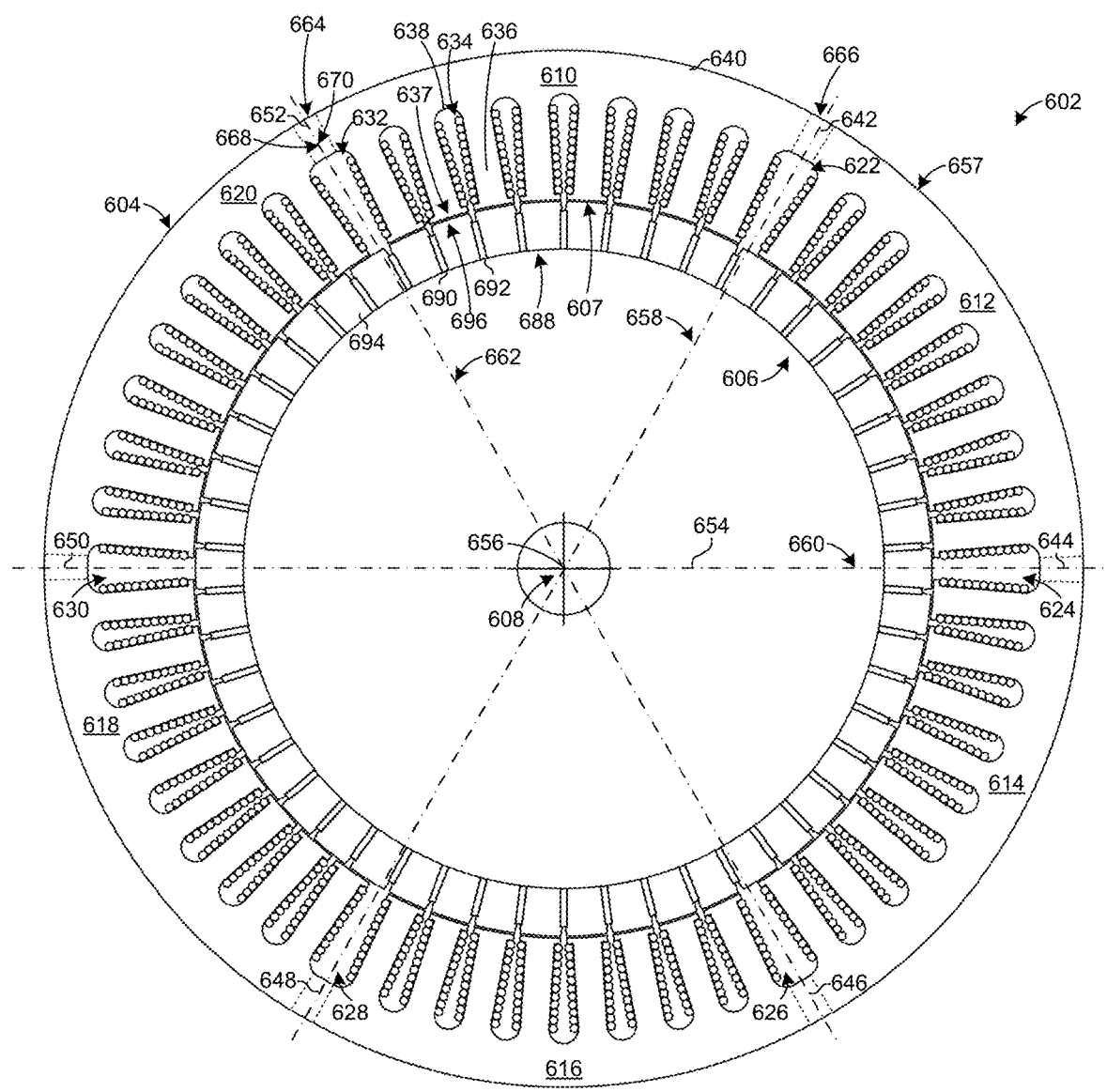

FIGS. 6-8 depicts an exemplary embodiment of a stator-rotor interface of a magnetically isolated phase interior permanent magnet electrical rotating machine (MIP-IPM-ERM) 602. While the example of FIGS. 6-8 depicts a three-phase machine (three electrical phases), two electrical phases, four electrical phases, or another number of electrical phases may be used. The machine can be, for example, a generator, a motor, or an alternator.

The machine 602 has a stator 604 and a rotor 606 with an air gap 607 between the stator and rotor defining a stator-rotor interface. The stator 604 and rotor 606 each rotate about an axis of rotation 608.

The stator 604 has two or more stator phase sections (also referred to as sectors) 610-620 that each are magnetically isolated from each other by a magnetically isolating area, such as one or more stator isolation regions 622-632. That is, no stator phase section shares a permanent magnet field with another phase. The electrical phases of the stator 604 are evenly distributed. The phase sections also are evenly distributed over the stator 604 of FIG. 6. Alternately, the phase sections can be evenly distributed over half or another portion of the stator.

Phase windings 634 (also referred to as coils) are wound about stator teeth 636 (alternately referred to as stator poles 637) through phase winding slots 638. For example, a phase winding slot 638 is an aperture in the stator core material 640 (stator back iron), and the stator may have two or multiples of two teeth. Magnetic flux is directed through the poles 636 of the stator.

In one example, the phase winding is a concentrated winding. However, the phase winding may not be a lap wound (distributed) winding, which could cause the machine to lock up or cause distortion when one phase is shorted to one or more other phases, as explained herein. Thus, the phase winding in this example is a concentrated, non-distributed winding.

While six stator phase sections 610-620 and six stator isolation regions 622-632 are depicted in the example of FIGS. 6-8, a different number of two or more stator phase sections and a different number of two or more stator isolation regions may be used in other examples.

The stator isolation regions 622-632 each may be arranged on or about a respective isolation region axis 642-652, such as at a selected distance (for example, angular or circumferential distance) from a reference 654. For example, a reference 654 may be designated as zero degrees on the stator 604 along the axis of rotation 608, and an isolation region axis 642-652 may be defined as an angular distance 655 (see FIG. 7), such as a selected number of degrees, from the reference. An isolation region axis 642-652 also may be defined as an angular distance from another isolation region axis. Radians, degrees, or another measurement may be used.

In the example of FIGS. 6-8, the reference 654 is designated as zero degrees (or radians), the angular distance to an isolation region axis 642-652 is sixty degrees (or radian equivalent) from the reference, and each other isolation region axis is defined at sixty degree (or radian equivalent) intervals from the reference, e.g. 60, 120, 180, 240, 300, and 360 (or 0). Other angular distances may be selected for other machines. For example, in one embodiment of a 2-phase machine, the angular distance is selected to be 45 degrees (or radian equivalent) from a selected reference, and in an embodiment of a 4-phase machine, the distance is selected to be 22.5 degrees (or radian equivalent) from a selected reference. In another example, the angular distances between two or more isolation region axes are not equal. For example, the angular distance from a reference to a first isolation region axis is a first angular distance, and an angular distance from the first isolation region axis to a second isolation region axis is a second angular distance.

The selected reference may be any reference on or with respect to the stator. In the example of FIGS. 6-8, the reference 654 is along an axis extending from a center point 656 of the axis of rotation 608 of the stator 604 to the outer circumference 657 of the stator. Angular distances for each isolation region axis 642-652 delineating each phase section 610-620 are measured from that reference 654. Alternately, for example, a first angular distance for a first phase section 612 is measured from the reference 654 to a first isolation region axis 642, and a second angular distance for a second phase section 610 is measured from the first isolation region axis 642 to a second isolation region axis 652. Alternately, a stator is split into two or more sections, with each section having two ends, and with each end having an isolation region or a portion of an isolation region.

In FIG. 6, two opposing isolation region axis 642 and 648, 644 and 650, and 646 and 652 form an isolation region plane 656, 658, and 660, respectively, extending from one isolation region 622, 624, and 626 to an opposing isolation region 628, 630, and 632, respectively. The isolation region planes 656, 658, and 660 divide the stator into the six phase sections.

Each stator phase section 610-620 has one side defined by one isolation region, and another side defined by another isolation region. For example, a first phase section 610 has one side 664 defined by one isolation region 632, and another side 666 defined by another isolation region 622. Alternately, the isolation region axes 634-644 define the sides of the sectors 610-620. For example, a first phase section 610 has one side 664 defined by one isolation region axis 652, and another side 666 defined by another isolation region axis 642.

Referring still to FIG. 6, half of an isolation region 622-632 is configured on each side of a corresponding isolation region axis 642-652 in the stator 604. For example, a portion, such as half, of the isolation region 622 is configured on one side 668 of the isolation region axis 652, and another portion, such as the other half, of the isolation region is configured on the other side 670 of the isolation region axis.

The isolation region 622-632 may be defined as an offset angular distance 672, such as an offset about an isolation region axis. While FIGS. 6-8 depict one half of the isolation region 622-632 configured on each side of the isolation region planes 658-662 (and corresponding isolation region axes) on opposing sides of the stator 604, the isolation regions 622-632 may be configured on each side of the corresponding isolation region axis 642-652 in the stator 604 and not strictly along isolation region planes (and corresponding isolation region axes).

In addition, the isolation region need not be split in half across an isolation region axis. A greater portion of the isolation region may be configured on one side of an isolation region axis and a lesser portion of the isolation region may be configured on the other side of the isolation region axis. Moreover, the length of two or more isolation regions along an isolation region axis may be the same or different (one axial length may be greater than another). Further, while the isolation regions 622-632 of FIGS. 6-8 are depicted as approximately frusto-conical having an axial length 674 (along the axial dimension) and an offset angular distance 672 (angular dimension) defining an inner side 676, an outer side 678, one edge side 680, and an another edge side 682 of the isolation region, an isolation region may have one or more other shapes (rectangle/rectangular, circle/circular, oval/ovular, notch, non-uniform area, etc.), and the shape or shapes of one isolation region may be different than the shape or shapes of another isolation region. The total region encompassed by one isolation region may be the same as or different than the total region encompassed by another isolation region.

One or more of the isolation regions 622-632 optionally may be configured with phase windings. As depicted in FIG. 7, the isolation region is an aperture defined as an offset angular distance 672, with half of the offset on each side of an isolation region axis, and the isolation region is at equal intervals of a selected phase section angular distance 655 from a reference. A winding slot area 684-686 is configured on each side of the isolation region, with half of a winding slot depicted in FIG. 8 on each side of the isolation region. Windings 687 may be wound in the winding slot areas 684-686, such as around teeth adjacent the winding slot areas.

As depicted more clearly on FIG. 7, a pole arc 702 defines the position of the winding slot, for example, by defining the distance between the winding slots (and, therefore, the rotor teeth). For example, the pole arc is an angular distance (in degrees or radians). The pole arc 702 also defines the distance from one side of the isolation region to an adjacent winding slot. In the example of FIG. 7, the pole arc 702 is an angular distance (in degrees or radians) from one side 704 of the isolation region 622 to a center point or axis 706 of an adjacent winding slot 708 or from the other side 710 of the isolation region 622 to a center point or axis of an opposing adjacent winding slot (see FIG. 6). The pole arc 702 in this example also is an angular distance (in degrees or radians) from the center point or axis 706 of the adjacent winding slot 708 to the center point or axis 712 of a next adjacent winding slot 714 (with no intervening isolation region). Thus, the distance from an isolation region axis 642 of the isolation region 622 to the center point or axis 706 of the adjacent winding slot 708 is one-half of the offset angular distance 672 plus one pole arc angular distance 702.

Referring again to FIG. 6, the rotor 606 has two or more rotor segments 688. Each rotor segment has two permanent magnets 690-692 mounted interior to the rotor core 694 and configured in a parallel arrangement to transfer magnetic flux through a rotor pole 696. The parallel arrangement means a north magnetic pole of one magnet faces the north magnetic pole of another magnet or a south magnetic pole of one magnet faces the south magnetic pole of another magnet. Both parallel facing magnetic poles, which are two poles of the same magnetic orientation facing each other in parallel, point to one pole of the stator through a pole of the rotor and the air gap.

A first rotor segment, for example, has a magnetic field from two rotor interior permanent magnets configured in parallel. A second, adjacent rotor segment is configured with an opposite magnetic field than the first rotor segment. For example, a first rotor segment is configured with two north facing interior permanent magnets in parallel, and a second, adjacent rotor segment is configured with two south facing interior permanent magnets in parallel.

No stator phase section 610-620 shares a permanent magnet field with another phase section. As a result, each phase section is magnetically isolated from, and is independent of, each other phase section. Therefore, if one stator phase section becomes inoperable, each other phase section still is operable. Thus, the machine 602 has redundancy. Moreover, such magnetic isolation eliminates the 3rd harmonic distortion and phase imbalance issues when the machine is configured as a generator. When the machine is configured as a motor, it eliminates the problem of the motor locking up when one electrical phase is shorted.

As described above, a phase section (alternately, sector) has two or more poles. The total number of poles in the stator (and in a sector of the stator) is divisible by at least two or a multiple of two so there are equal numbers of parallel facing magnetic fields (for example, north pole facing north pole or south pole facing south pole). In one embodiment, the total number of poles in the stator is divisible by four.

In the example of FIGS. 6-8, the pole arc is the number of degrees or radians from the center of one pole on the stator to the center of an adjacent pole on the stator with no intervening isolation region. Similarly, when aperture spacing between two adjacent poles is equal, the pole arc also will be the number of degrees from the center of one pole aperture in the stator to the center of an adjacent pole aperture in the stator with no intervening isolation region.

The methods discussed in connection with FIG. 6 may be used to create one or more isolation regions for stators having a different number of electrical phases and a different number of phase sections than shown in FIG. 6. For example, isolation regions may be created for two-phase, four-phase, or other phase machines and/or two, four, eight, and other phase sections. Moreover, one or more isolation regions may be created on a rotor using the techniques described herein.

In one aspect, the highest rotor to stator active area is achieved by minimizing the area of each stator isolation region between two magnetically isolated section phases (also referred to as sectors). In this aspect, the isolation region area occupies a least angular distance, such as a least number of degrees.

The pole arc, in degrees, is determined by:

$$\text{pole arc [deg]} = \frac{\text{degrees per magnetically isolated phase section (sector)}}{\text{no. of poles per sector} + \frac{1}{\text{no. of electical phases}}} \quad \text{Eq. 2}$$

The sector (that is, the degrees in a sector) and the number of poles per sector are selectable variables. A reciprocal of the electrical phases is equal to one divided by the number of electrical phases.

A phase section (sector) is magnetically isolated from another phase section by the isolation region. The isolation region is an area that magnetically isolates two phase sections of the stator from each other. In one example, the isolation region is an aperture. In another example, the isolation region is one or more apertures, such as one or more notches. In another example, the isolation region is comprised of non-magnetic material.

It should be noted that a phase section is different than an electrical phase. The electrical phase is generally the number of electrical phases in a machine, such as 2 phase, 3 phase, 4 phase, 8 phase, and other phases.

The isolation region may be defined by an isolation region offset, angular distance, area, or other mechanism. In one example, an isolation region offset is an offset (in degrees) added to an aperture between two poles of the stator (e.g. winding slot), a starting and ending angular distance from a pole, a starting and ending angular clockwise distance (in degrees) or counterclockwise distance (in degrees) from a selected point on the stator (for example, from zero degrees, 45, degrees, 60 degrees, 90 degrees, 120 degrees, etc. of a center point), an angular distance offset from a reference, axis or plane (e.g. isolation region axis or plane or phase section axis described herein), or another distance. In one example, the isolation region is defined by an aperture having an angular distance offset about (e.g. a portion on either side) an axis or plane. In another example, the isolation region is an aperture, and an axis or plane (e.g. isolation region axis or plane described herein) bisects the isolation region. In another example, the isolation region is defined by an aperture that is offset between a pole of one section and the pole of another section, and the total angular distance of the aperture is equal to the winding slot plus the isolation region offset.

When the isolation region offset is determined as an angular distance, such as from or about an isolation region axis or plane, a reference, or a phase section end (or a reference from a winding slot), the total isolation region offset (per sector) is given (in degrees) by:

$$\text{isolation region offset [deg]} = \text{pole arc} \bullet \frac{1}{\text{no. of electical phases}} \quad \text{Eq. 3}$$

In this example, at least approximately one-half of the isolation region offset effectively is provided to one side of the sector, and the other approximately one-half of the isolation region is provided to the other side of the sector. The application of this can be considered to take several forms. Since the isolation region magnetically isolates each section, half of each total isolation region effectively is assigned to each sector.

The total number of stator poles is given by:

$$\text{no. stator poles} = \frac{360}{\text{degrees per sector}} \bullet \text{no. poles per sector} \quad \text{Eq. 4}$$

To satisfy the rotor geometry, the pole arc results in a number that, when 360 is divided by the pole arc, is divisible by 2.

The rotor has two or more rotor poles. The total number of poles in the rotor is divisible by at least two or a multiple of two so there are equal numbers of parallel facing magnetic poles (for example, north-north or south-south). The total number of rotor poles is given by:

$$\text{no. rotor poles} = \frac{360}{\text{pole arc}} = \frac{360}{\text{degrees per sector}} \qquad \text{Eq. 5}$$
$$\frac{}{\text{no. of poles} + \frac{1}{\text{no. of electical phases}}}$$

Equations 2-5 may be referred to as optimization formulas.

2 Phase Geometry Example.

In one aspect, a two-phase geometry is selected. In the two-phase geometry, the sector (e.g. degrees in a sector, also referred to as a phase section) is equal to 360 divisible by multiples of 4, for example 90, 45, 30, 22.5, 18, 15, or 12. In one example, the sector (e.g. degrees per sector) is selected to be 90 degrees and the number of stator poles in a sector is selected to be equal to 12. Then, from Equation 2, the pole arc is 7.2 degrees:

$$\text{pole arc [deg]} = \frac{90}{12 + \frac{1}{2}} = 7.2 \text{ deg} \qquad \text{Eq. 6}$$

Applying Equation 3, the isolation region offset is 3.6 degrees:

$$\text{isolation region offset} = 7.2 \cdot \tfrac{1}{2} = 3.6 \text{ deg} \qquad \text{Eq. 7}$$

And, the number of stator poles is equal to 48:

$$\text{stator poles} = \frac{360}{90} \cdot 12 = 48, \qquad \text{Eq. 8}$$

And, the number of rotor poles is equal to 50:

$$\text{no. rotor poles} = \frac{360}{7.2} = \frac{360}{\frac{90}{12 + \frac{1}{2}}} = 50 \qquad \text{Eq. 9}$$

Other example solutions are identified by the following Table 1.

TABLE 1

| Sector [deg] | Poles/Sector | Stator Teeth (total per Stator) | Rotor Poles |
|---|---|---|---|
| 18 | 4 | 80 | 90 |
| 18 | 12 | 240 | 250 |
| 18 | 20 | 400 | 410 |
| 22.5 | 4 | 64 | 72 |
| 22.5 | 12 | 192 | 200 |
| 30 | 12 | 144 | 150 |
| 45 | 4 | 32 | 36 |
| 45 | 12 | 96 | 100 |
| 90 | 4 | 16 | 18 |
| 90 | 12 | 48 | 50 |

Figure 9:
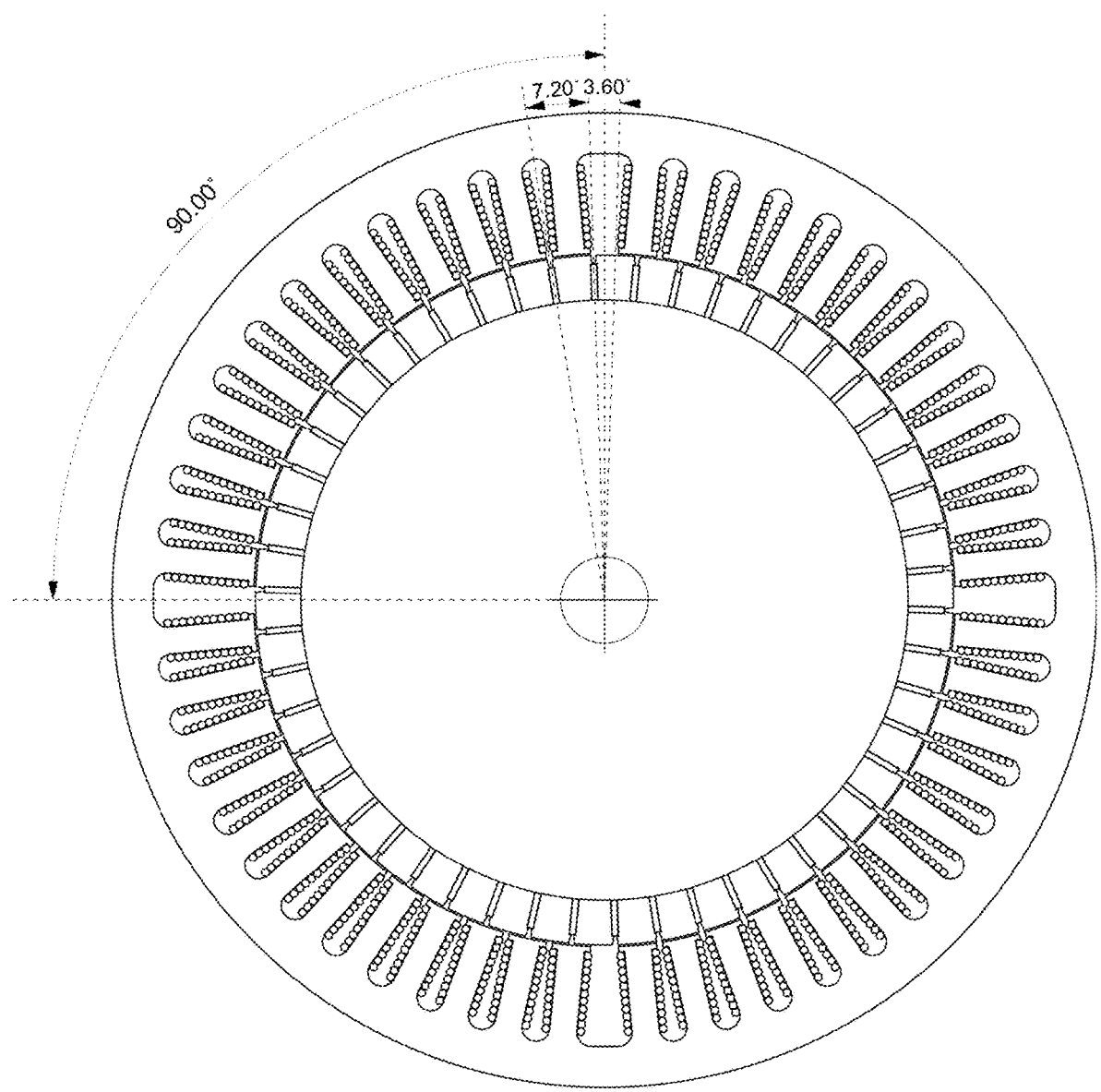
FIG. 9 is a diagram of a magnetically isolated phase interior permanent magnet electrical rotating machine.

FIG. 9 shows an example of a 2 phase machine constructed using the results of the optimization formulas.

3 Phase Geometry Example.

In another aspect, a three-phase geometry is selected. In the three-phase geometry, the sector (e.g. degrees in a sector, also referred to as a phase section) is equal to 360 divisible by multiples of 3, for example 120, 60, 30, or 15. In one example, the sector (e.g. degrees per sector) is selected to be 60 degrees, and the number of stator poles in a sector is selected to be equal to 8. Then, from Equation 2, the pole arc is 7.2 degrees:

$$\text{pole arc [deg]} = \frac{60}{8 + \frac{1}{3}} = 7.2 \text{ deg} \qquad \text{Eq. 10}$$

Applying Equation 3, the isolation region offset is 2.4 degrees:

$$\text{isolation region offset} = 7.2 \cdot \tfrac{1}{3} = 2.4 \text{ deg} \qquad \text{Eq. 12}$$

And, the number of stator poles is equal to 48:

$$\text{stator poles} = \frac{360}{60} \cdot 8 = 48, \qquad \text{Eq. 12}$$

And, the number of rotor poles is equal to 50:

$$\text{no. rotor poles} = \frac{360}{7.2} = \frac{360}{\frac{60}{8 + \frac{1}{3}}} = 50 \qquad \text{Eq. 13}$$

Other example solutions are identified by the following Table 2.

TABLE 2

| Sector [deg] | Poles/Sector | Stator Teeth (total per Stator) | Rotor Poles |
|---|---|---|---|
| 30 | 8 | 96 | 100 |
| 60 | 8 | 48 | 50 |

Figure 10:
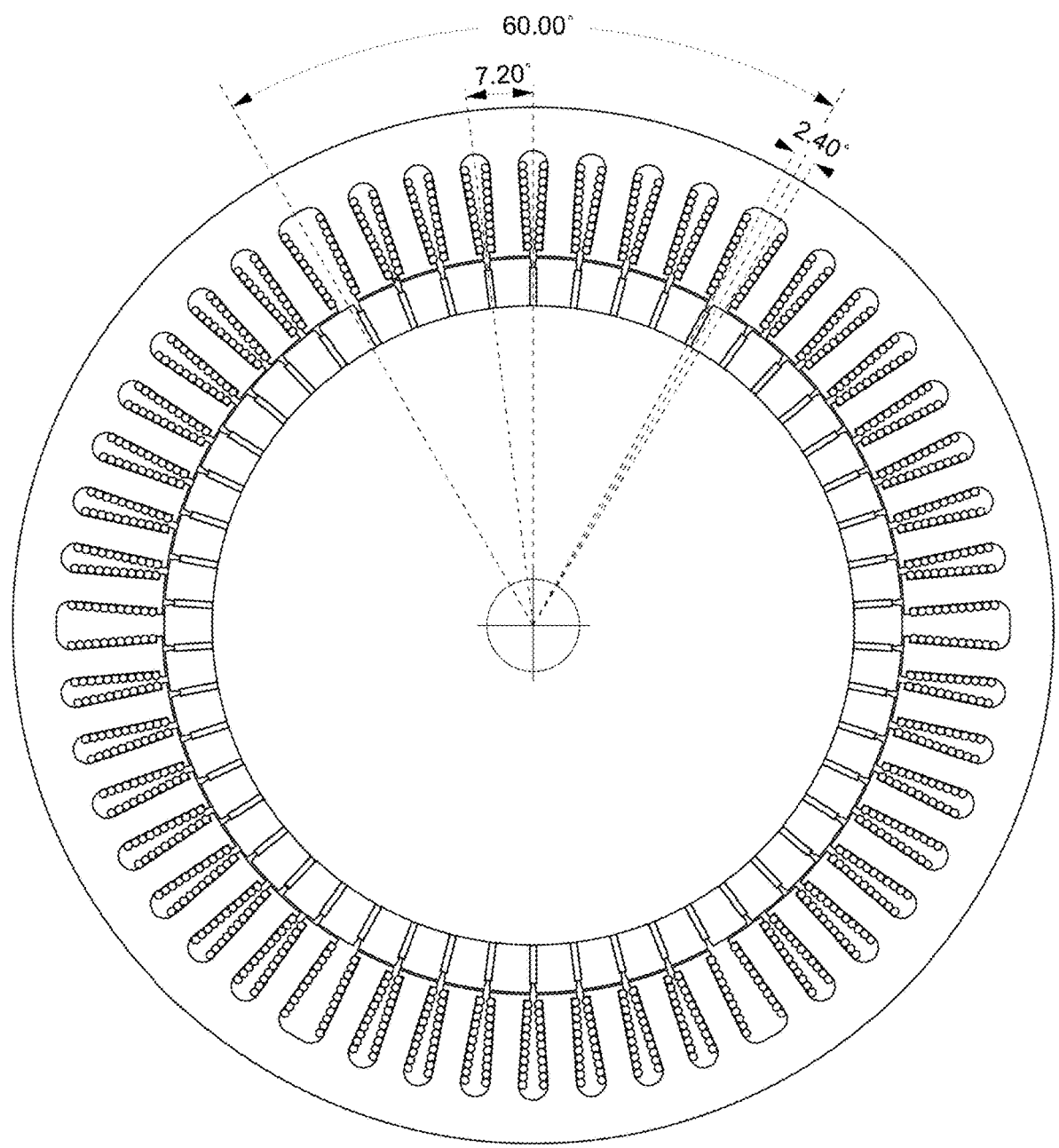
FIG. 10 is a diagram of a magnetically isolated phase interior permanent magnet electrical rotating machine.

FIG. 10 shows an example of a 3 phase machine constructed using the results of the optimization formulas.

Figure 11:
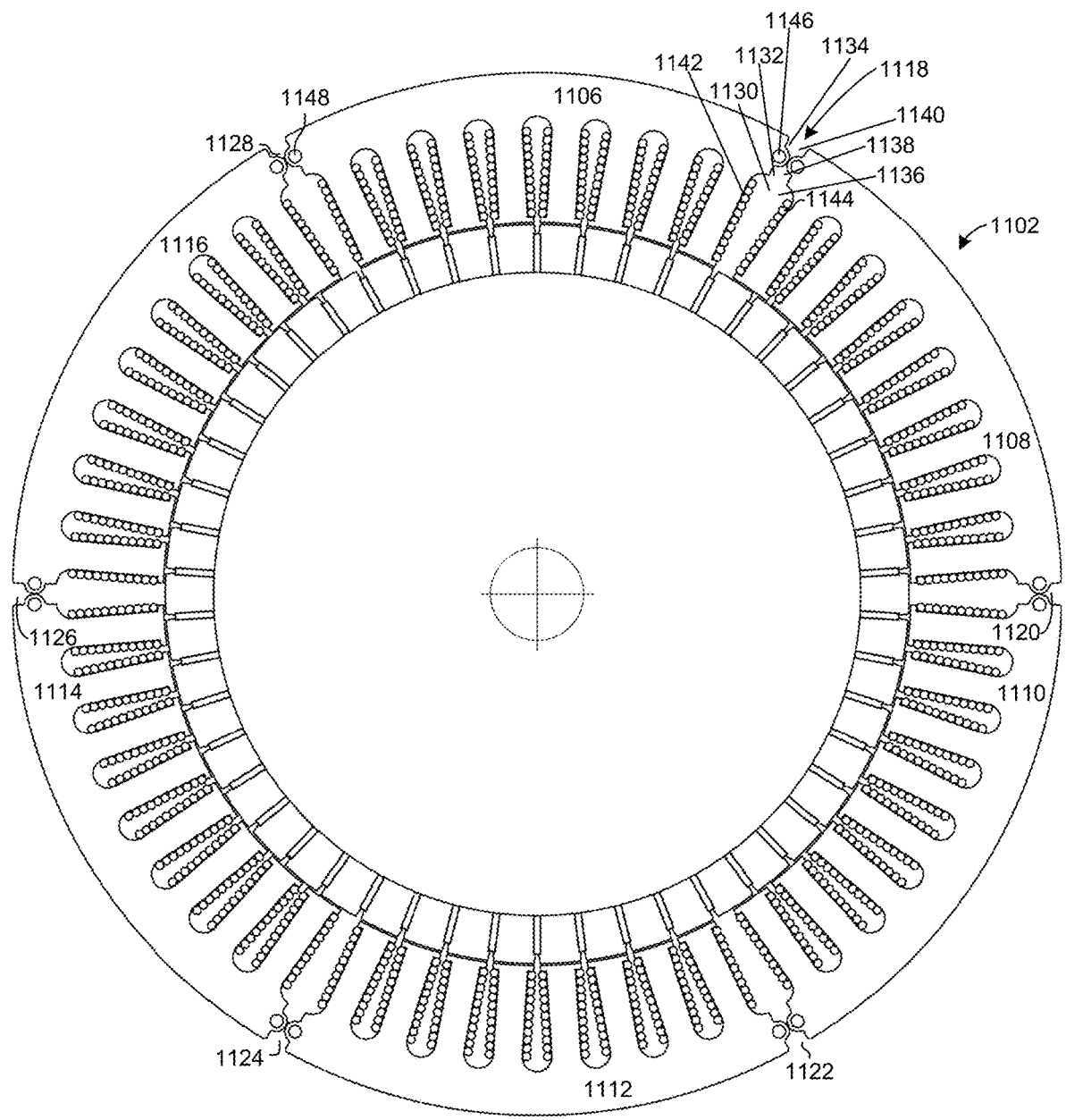
FIG. 11 is a diagram of a magnetically isolated phase interior permanent magnet electrical rotating machine with arc segments.
Figure 12:
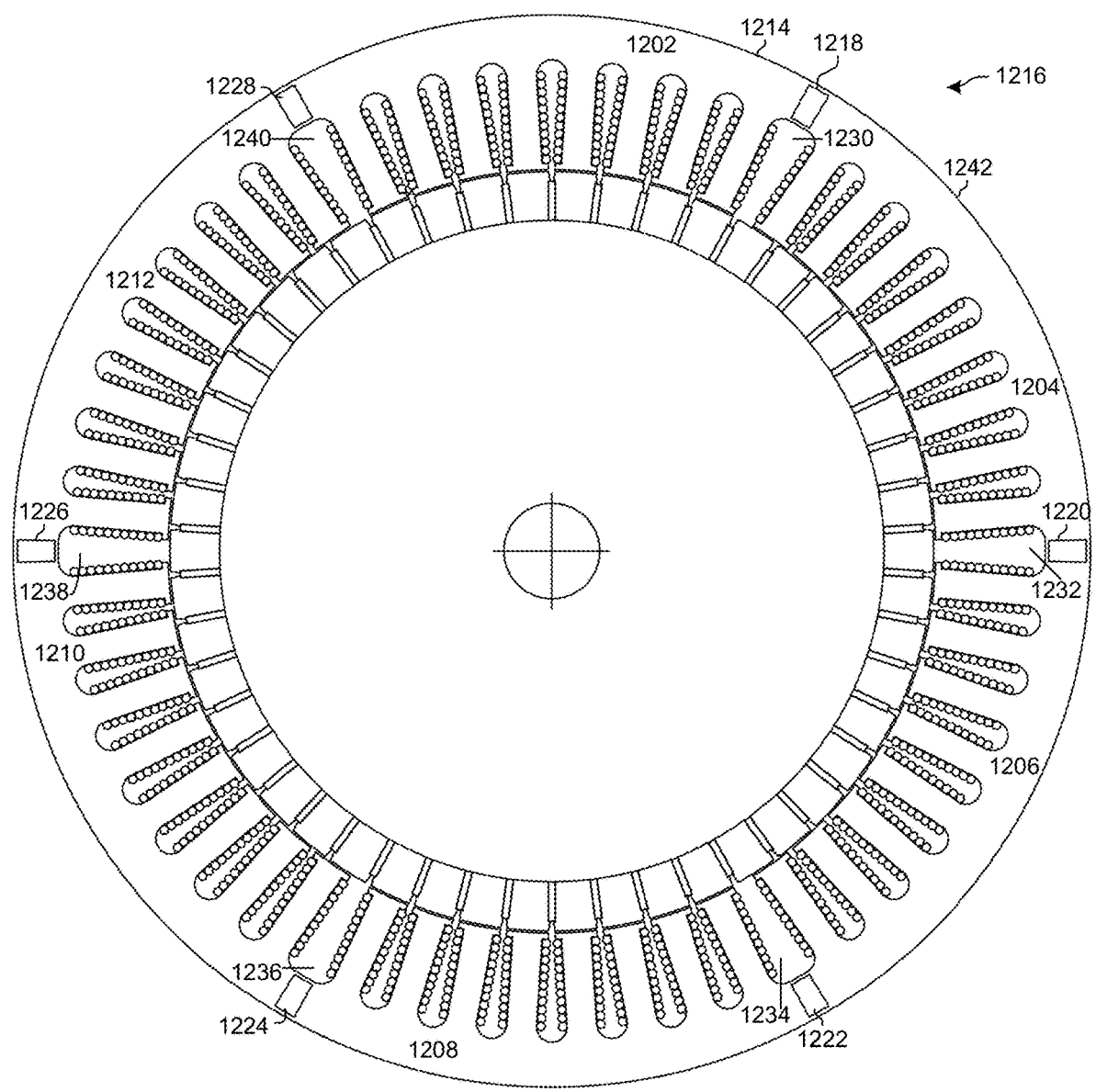
FIG. 12 is a diagram of a magnetically isolated phase interior permanent magnet electrical rotating machine.

Referring now to FIGS. 11 and 12, magnetic phase isolation does not require phase sections (sectors) to be magnetically "connected." Therefore, an isolation region may be created by forming a phase section with one or more apertures, notches, or inwardly recessed areas. Alternately, material may be removed from an area adjacent one or more other apertures to form an isolation region. These embodiments can be used to reduce the amount of magnetic core material used to form the stator.

Referring to FIG. 11, the phase sections (sectors) are independent phase sections separated at or by one or more isolation regions. As shown in the machine 1102 of FIG. 11, phase sections 1-6 of the stator core 1104 can be constructed as individual arc segments 1106-1116, respectively, as opposed to a continuous ring. The isolation regions 1118-1128 are created by forming recessed areas in each arc segment. For example, a first phase section arc segment 1106 has recessed areas 1130-1134 (including half of an offset, half of a first notch, and half of a second notch, respectively), and a second phase section arc segment 1108 has recessed areas 1136-1140 (including half of an offset, half of a first notch, and half of a second notch, respectively). Each of the arc segments 1106 and 1108 also includes a half winding slot area 1142-1144. Together, the recessed areas 1130-1134 and 1136-1140 create an isolation region having an isolation region offset, a first notch, and a second notch. Though, a phase section may have an isolation area with one or more apertures, notches, and/or or inwardly recessed areas.

Each of the arc segments 1106-1116 may be secured to stator core material, to other arc segments in the same phase section, or to other arc segments by a securing device 1146-1148. For example, stacks of arc segment laminants may be stacked for each phase section and secured by a pin, rivit, screw, t-lock, clamp, notches to mount the phase section, or other securing device that holds the circular arc of the phase section within or on a structure, such as the core material or back iron. Alternately, the arc segment is a single laminant secored to stator core material.

In the embodiment of FIG. 11, the electrical phase-phase section (e.g. sector) relationship is as follows: phase sections 1 (1106) and 4 (1112) form electrical phase 1, phase sections 2 (1108) and 5 (1114) form electrical phase 2, and phase sections 3 (1110) and 6 (1116) form electrical phase 3. While the isolation region of example of FIG. 11 includes an isolation region offset and two notch areas in each arc segment, one or more of the offset, one or more notch areas, and/or one or more other recessed areas may be used.

Referring now to FIG. 12, core material may be removed from an area adjacent one or more other apertures to form an isolation region. Magnetic isolation between the phase sections 1202-1212 of a stator 1214 in a machine 1216 also can be achieved or enhanced by forming one or more other apertures 1218-1228 at the isolation regions 1230-1240, such as by removing core material 1242 from the stator core between the phase sections, e.g. at the isolation regions.

Figure 13:
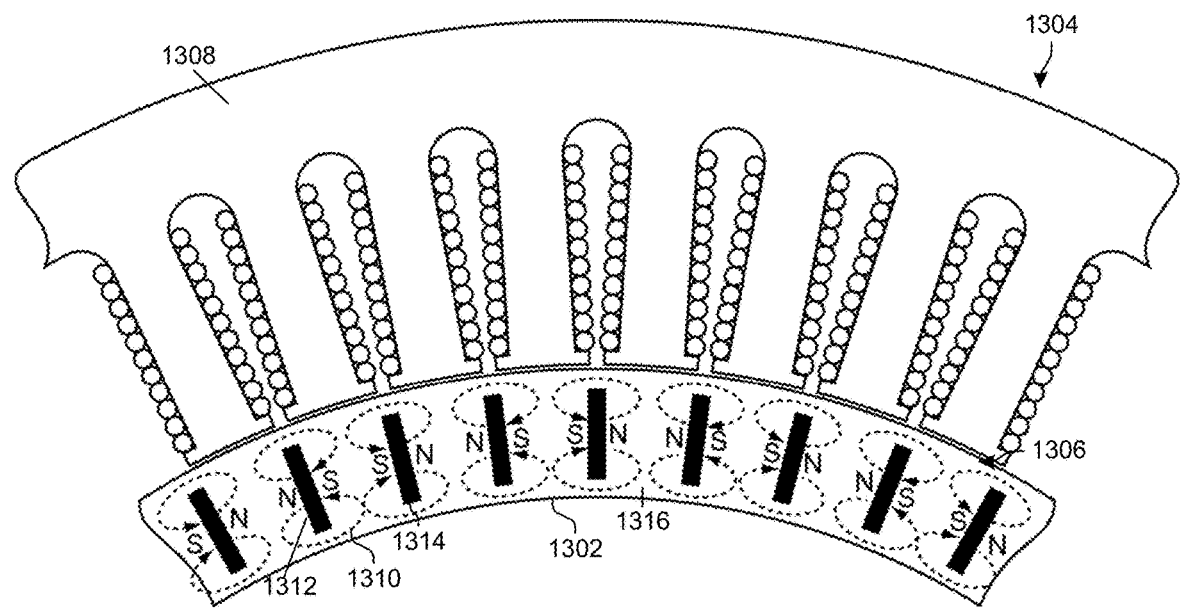
FIG. 13 is a diagram depicting a rotor without a bridge.
Figure 14:
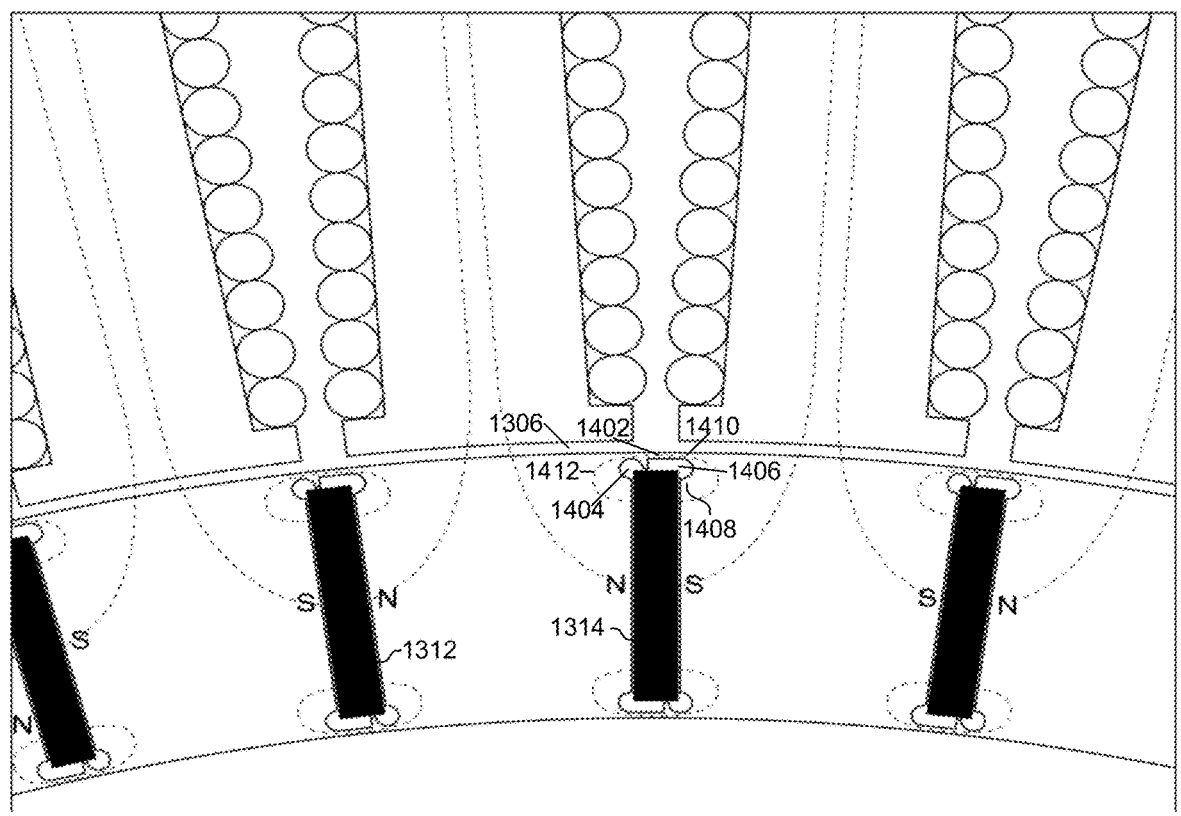
FIGS. 14-15 are diagrams of a saturatable bridge in a rotor.
Figure 15:
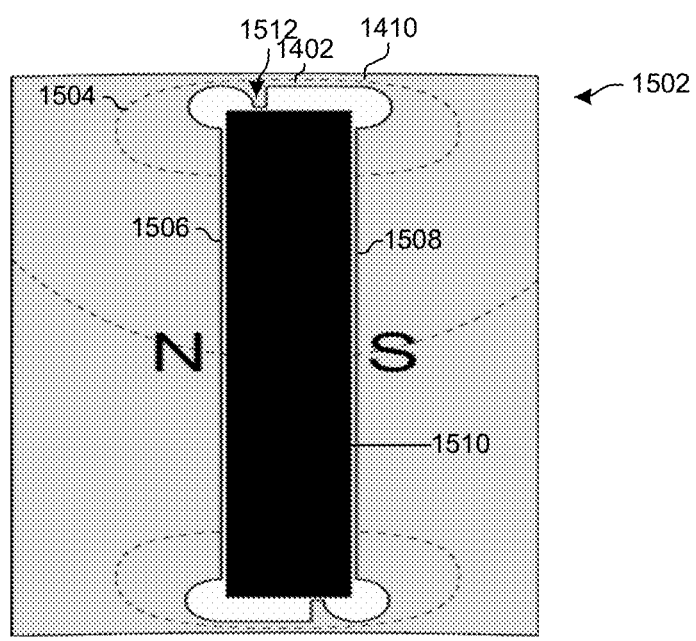

Referring to FIGS. 13-15, the rotor core 1302 of a machine 1304 can be individual arc segments as opposed to a continuos ring. If the rotor core 1302 is comprised of a single ring, the segments are connected to each other with "saturatable" bridge sections 1402 (see FIG. 14) to prevent the rotor permanent magnets from being "shorted" within the rotor core material. The goal is to place as much permanent magnet flux across the air gap 1306 between the rotor 1302 and stator 1308 as is possible. As shown in FIG. 13, if "saturatable" bridges are not used, the flux 1310 from the permanent magnets 1312-1314 would simply traverse through the rotor core iron 1316 rather than across the air gap 1306 and through the stator phase section core material, resulting in the magnet's flux being shorted in rotor core iron 1314.

As shown in FIG. 14, a portion of the rotor core iron is judiciously removed about the permanent magnets creating air regions 1404-1406 separating the north (N) and south (S) poles of a permanent magnet 1312. A small section of core iron creates the saturatable bridge 1402 that remains to connect the rotor segments 1408-1410. A portion of the permanent magnet (PM) flux 1412 traverses the saturatable bridges. Since the bridge sections have a small cross section, the bridge sections saturate and force the majority of the PM flux 1412 across the air gap 1306 into the stator phase section (e.g. stator sector).

Referring to the enlarged view of a section 1502 of the rotor 1302 in FIG. 15, it can be seen that the saturating bridge 1402 is the smallest section of rotor iron 1314 that allows flux 1504 to traverse from the north pole 1506 and south pole 1508 of a permanent magnet 1510. The protrusion 1512 added (or remaining) in the saturating bridge 1402 serves to hold the permanent magnet 1510 in place and is a structural component as opposed to being a magnetically active component.

Figure 16:
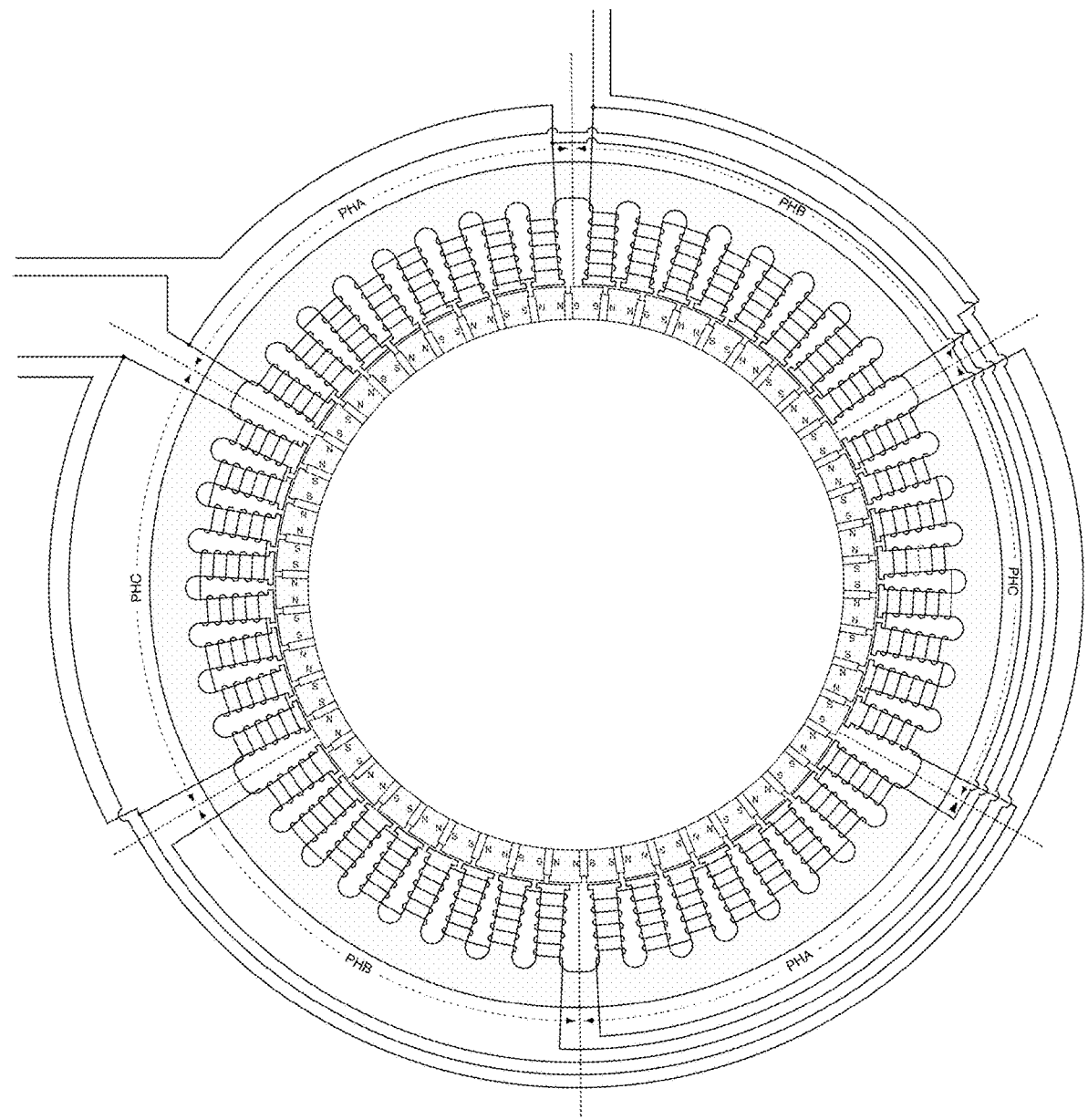
FIG. 16 is a wiring diagram for a magnetically isolated phase interior permanent magnet machine.

FIG. 16 depicts an exemplary embodiment of a wiring diagram for a 3 phase magnetically isolated phase interior permanent magnet machine, with each of the electrical phases repeated twice. The diagram of FIG. 16 shows series windings in a phase. Alternately, the windings could be connected in parallel or in a combination of parallel and series connections.

Rotor Permanent Magnet's Magnetic Polarity

Figure 17:
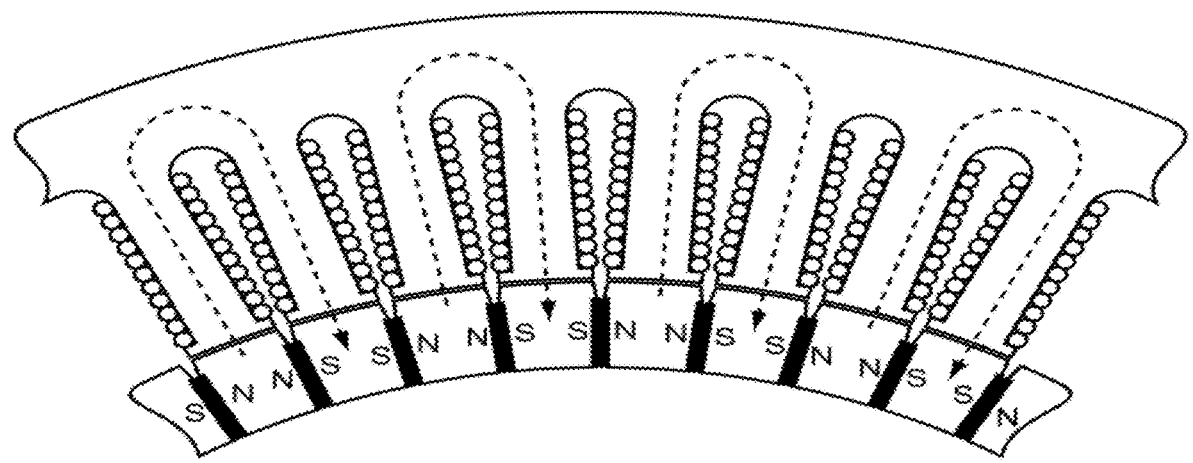
FIG. 17 is a diagram of magnetic polarity in a magnetically isolated phase interior permanent magnet electrical rotating machine.

Referring to an embodiment of FIG. 17, a number of degrees that the isolation region in the stator occupies is determined by a number of selected electrical phases and the pole arc for poles within a phase section. In the exemplary optimization formulas herein, the pole arc is dependent upon other variables. For instance, pole arcs can be identified that have a large fraction or other fraction of a degree. If the number of stator poles shown in the three phase embodiment of FIG. 10 (equations 10-13) was increased from 8 poles (which is depicted in FIG. 17) to 12 poles, the equations would return a pole arc of 4.864864864 . . . 864 degrees. It would be difficult to manufacture a stator with pole arcs to that fraction of degree since the fractional part of the degrees would result in an accumulated error over 360 degrees. Though, these pole arcs are not excluded from the scope of this disclosure since the otherwise accumulated error could be equally distributed between the phases. These pole arcs would work to form an operating machine using the methods taught herein. For example, for a two-phase machine, the number of degrees that a magnetically isolated region would occupy between the phase sections is the pole arc divided by two. For a three-phase machine, the number of degrees that a magnetically isolated region would occupy between the phase sections is the pole arc divided by three. For a four-phase machine, the number of degrees that a magnetically isolated region would occupy between the phase sections is the pole arc divided by four, and so on. The number of degrees the isolation region occupies also determines both the mechanical and electrical degrees offset between the phases.

Figure 18:
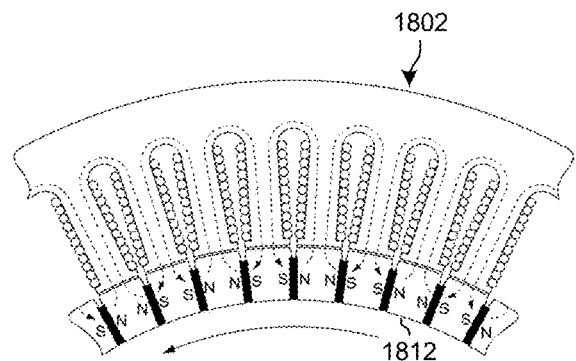
FIGS. 18-19 are diagrams of creating one or more isolation regions in a magnetically isolated phase interior permanent magnet electrical rotating machine.
Figure 19:
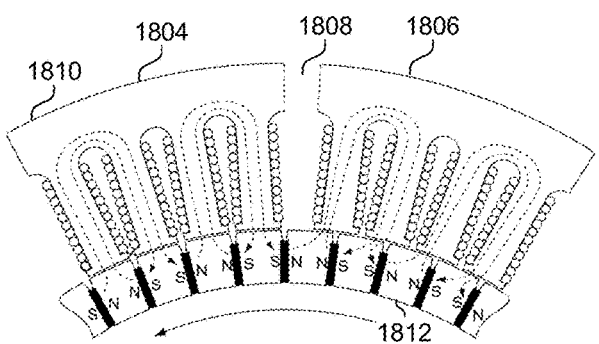

FIGS. 18-19 depict another exemplary embodiment of creating one or more isolation regions in a magnetically isolated two-phase interior permanent magnet electrical rotating machine. A stator section 1802 of a single phase topology is depicted in FIG. 18. The stator section 1802 is split into two stator segments 1804 and 1806, and the second stator segment is rotated clockwise by a number of degrees equal to one-half of the pole arc. In the above example of FIG. 10, the pole arc is 7.2 degrees. Staying with that example, the second segment 1806 is rotated 3.6 degrees. The void 1808 in the stator core 1810 after the rotation of the second stator segment 1806 becomes the isolation region, and each of the stator segments become the machine phase sections. If the rotor 1812 was rotated in a counter clockwise manner, an advance by a rotor tooth of (a distance of) one stator tooth represents 180 electrical degrees for the phase created by the first stator segment 1804. Since the second stator segment 1806 rotated clockwise, and the rotor is rotating counter clockwise, the phase created by the second stator segment 1806 will "lead" the phase created by first stator segment 1904 by 90 electrical degrees. The relationship between mechanical degrees versus electrical degrees is given by:

$$\text{pole arc} = 7.2 \text{ deg and } \frac{180 \text{ deg}}{\text{pole arc}} = 25 \text{ deg.}$$

Therefore each mechanical degree equals twenty-five electrical degrees, By rotating the second stator segment 1806 by 3.6 mechanical degrees, the shift in electrical degrees between the phases is 90 degrees as shown by:

$$25 \text{ deg} \cdot 3.6 = 90 \text{ deg; therefore } 180 \text{ deg} - 90 \text{ deg} = 90 \text{ deg.}$$

Figure 20:
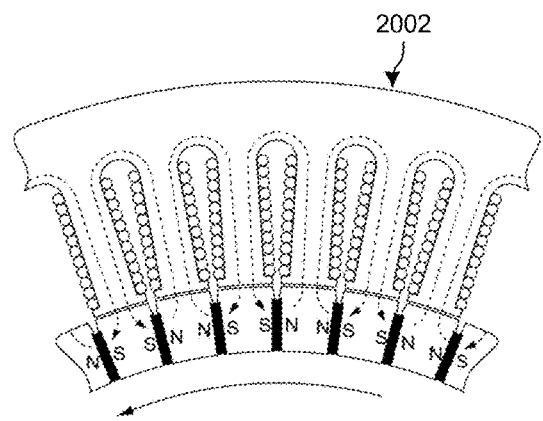
FIGS. 20-21 are diagrams of creating one or more isolation regions in a magnetically isolated phase interior permanent magnet electrical rotating machine.
Figure 21:
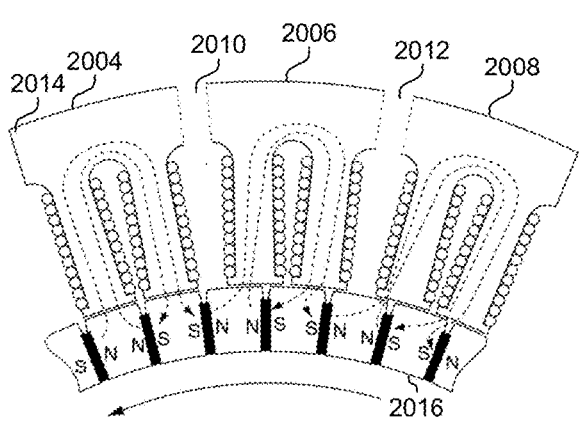

FIGS. 20-21 depict another exemplary embodiment of creating one or more isolation regions in a magnetically isolated three-phase interior permanent magnet electrical rotating machine. A stator section 2002 of a single phase topology is depicted in FIG. 20. The stator segment 2002 is split into three stator segments 2004-2008. The second and third stator segments 2006-2008 are rotated clockwise by a number of degrees equal to one-third of the pole arc. In the above example where the pole arc is 7.2 degrees, the second and third stator segments 2006-2008 are rotated 2.4 degrees with respect to the first stator segment 2004. Next, the third stator segment 2008 is rotated 2.4 degrees with respect to the second stator segment 2006. The voids 2010-2012 in the stator core 2014 after the rotation of the second and third stator segments 2006-2008 become the isolation regions, and each of the stator segments 2004-2008 become the machine's phase sections. As in the two-phase discussion, it was determined that one mechanical degree equals 25 electrical degrees. Since the second stator segment 2006 was rotated clockwise 2.4 degrees with respect to the first stator segment 2004, and the third stator segment 2008 was rotated clockwise 2.4 degrees with respect to the second stator segment 2006, the following phase relationships result:

$$25 \text{ deg} \cdot 2.4 = 60 \text{ deg; therefore } 180 \text{ deg} - 60 \text{ deg} = 120 \text{ deg.}$$

Each of the machine's phases then has a phase shift of 120 electrical degrees between one another.

Figure 22:
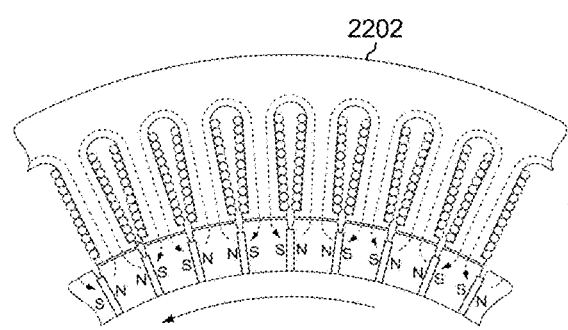
FIGS. 22-23 are diagrams of creating one or more isolation regions in a magnetically isolated phase interior permanent magnet electrical rotating machine.
Figure 23:
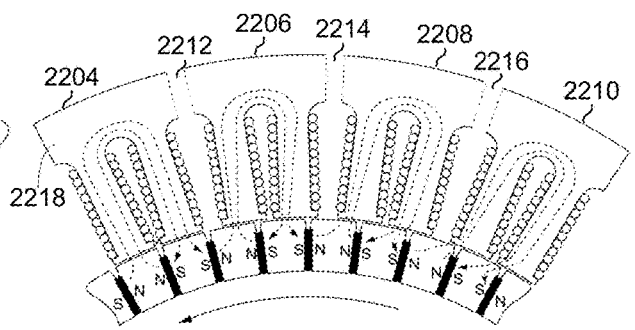

FIGS. 22-23 depict another exemplary embodiment of creating one or more isolation regions in a magnetically isolated four-phase interior permanent magnet electrical rotating machine. A stator section 2202 of a single phase topology is depicted in FIG. 22. The stator section 2202 is split into four stator segments 2204-2210. The second, third, and fourth stator segments 2206-2210 are rotated clockwise by a number of degrees equal to one-fourth of the pole arc. In the example where the pole arc is 7.2 degrees, the second, third, and fourth stator segments 2206-2210 are rotated 1.8 degrees with respect to the first stator segment 2204. Then, the third and fourth stator segments 2208-2210 are rotated 1.8 degrees with respect to the second stator segment 2206, and the fourth stator segment 2210 is rotated 1.8 degrees with respect to the third stator segment 2208. The voids 2212-2216 in the stator core 2218 after the rotation of the second, third, and fourth stator segments 2206-2210 become the isolation regions, and each of the stator segments 2204-2210 become the machine's phase sections. As in the two-phase discussion, it was determined that one mechanical degree equals 25 electrical degrees. Since second, third, and fourth stator segments 2206-2210 were rotated clockwise 1.8 mechanical degrees with respect to one another, the following phase relationships result:

$$25 \text{ deg} \cdot 1.8 = 45 \text{ deg.}$$

Each of the machine's phases then has a phase shift of 45 electrical degrees between one another.

A motor with any number of desired electrical phases can be produced in the magnetically isolated phase interior permanent magnet electrical rotating machine.

In the examples above, a magnetically isolated two-phase interior permanent magnet electrical rotating machine would have four stator segments each spanning 90 degrees with 12 teeth per segment, a magnetically isolated three-phase interior permanent magnet electrical rotating machine would have six stator segments, each spanning 60 degrees with 8 teeth per segment, and a magnetically isolated four-phase interior permanent magnet electrical rotating machine would have eight stator segments each spanning 45 degrees with 6 teeth per segment, all having a pole arc of 7.2 degrees. This would result in all three machines having 48 stator teeth and 50 rotor teeth. However, other machines having other numbers of stator segments/phase sections, electrical degrees for a segment/phase section, stator teeth, rotor teeth, pole arc, and offset may be created and used.

In a magnetically isolated phase interior permanent magnet electrical rotating machine, all of the stator teeth are producing torque simultaneously and at different angular intervals, thereby producing a torque or power at the stator to rotor interface of 96% (48 stator teeth/50 rotor teeth) as opposed to 70% or less for most conventional permanent magnet rotating machines.

Figure 24:
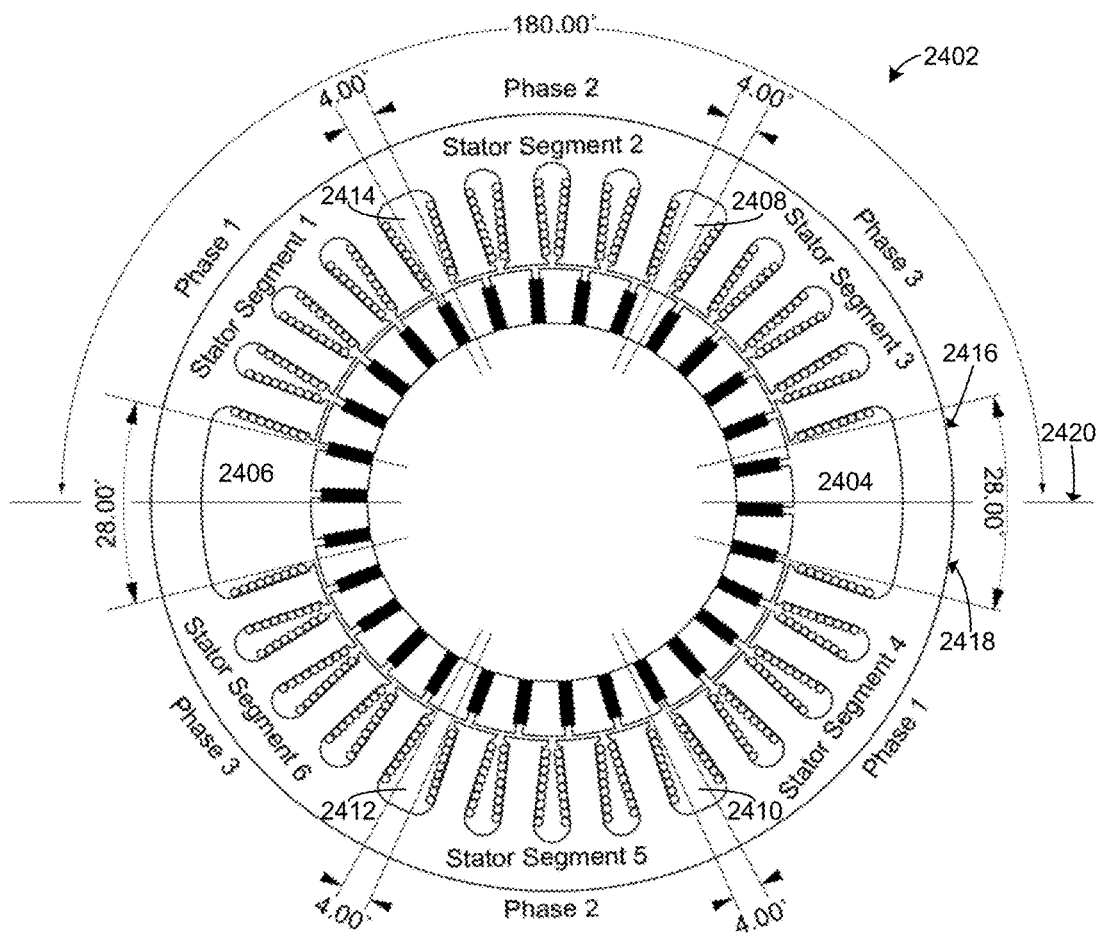
FIG. 24 is a diagram of a mirrored magnetically isolated phase interior permanent magnet electrical rotating machine.

Referring to FIG. 24, another embodiment for a mirrored magnetically isolated phase interior permanent magnet electrical rotating machine 2402 is based upon distributing a desired number of phase sections over 180 angular degrees and then "mirroring" the phase section layout over the remaining 180 degrees.

The electrical phases in the stator are evenly distributed. In one example, one or more sets of two opposing isolation regions 2404 and 2406 are larger than one or more sets of two other isolation regions 2408-2414, including one or more sets of two opposing isolation regions (2408 and 2412; 2410 and 2414) or isolation regions that otherwise magnetically isolate phase sections. However, the electrical phases are evenly distributed. For example, a machine is divided into an upper half 2416 and a lower half 2418 along a dividing or mirroring axis 2420. The opposing set of isolation regions 2404 and 2406 dividing the upper and lower halves 2416-2418 has a isolation region area that is larger than the isolation regions 2408-2414 in the upper and lower halves.

This method can be used to construct a magnetically isolated phase interior permanent magnet electrical rotating machine when the optimization formulas do not return a desired result for a given number of rotor poles, teeth per segment, or another of the design criterion. For example, in a three phase topology in which it may be desirable for the rotor to have 30 poles, the optimization equations would return a pole arc of 11.996800853105839 degrees and would require 4.668 teeth per segment. Therefore, a pole arc of 12 degrees (360/30) could be used. It would still be desirable to use the optimized angular offset (displacement) for the isolation region. In this case, 12 degrees is divisible by 3 (e.g. the number of electrical phases). Therefore, the isolation region would equal 4 degrees. Three stator segments separated by two isolation regions are evenly distributed over 180 degrees and then mirrored over the remaining 180 degrees. This will result in isolation regions with a different angular displacement located at the mirroring axis where the mirroring occurs.

Figure 25:
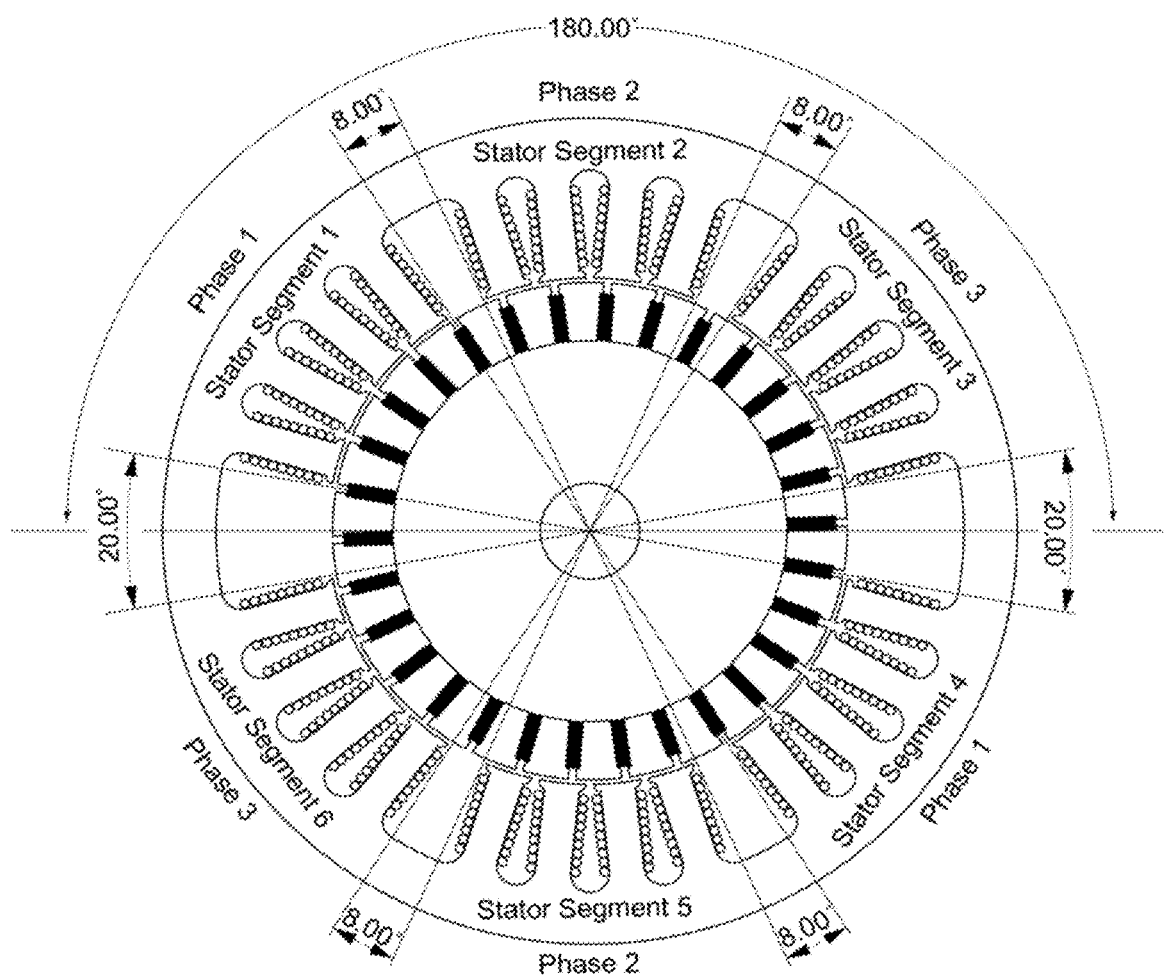
FIG. 25 is a diagram of a mirrored magnetically isolated phase interior permanent magnet electrical rotating machine.

Alternately, as depicted in FIG. 25, the three stator segments occupying the first 180 degrees could be separated by two isolated regions equaling two-thirds of a pole arc without losing the 120 electrical degrees of displacement between the three phases. This arrangement is mirrored to the remaining 180 degrees. The methods of FIGS. 24-25 to produce a mirrored machine further reduce the cost of the rare earth magnets, thereby resulting in low cost, low wattage motors. The mirrored machine of FIGS. 24-25 is an alternative to the optimized machine of FIGS. 6 and 10.

Figure 26:
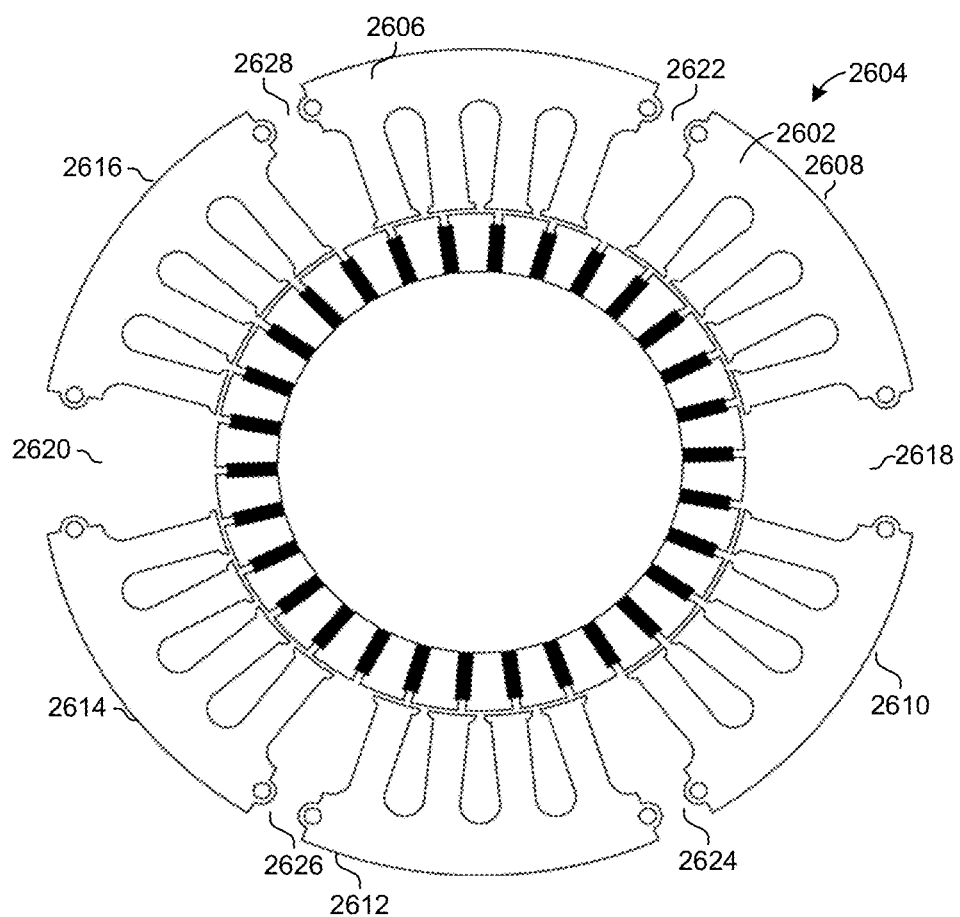
FIG. 26 is a diagram of a mirrored magnetically isolated phase interior permanent magnet electrical rotating machine.

Referring to FIG. 26, as with an optimized isolated phase interior permanent magnet electrical rotating machine described above, the stator core material 2602 in the isolation regions of the mirrored machine 2604 could also be eliminated. In this example, stator arc segments 2606-2616 are created for the phase sections as in the example of FIG. 11, though using the mirrored machine approach with at least two opposing isolation regions 2618-2620 being larger than two or more other opposing isolation regions 2622-2628 or other isolation regions.

Generator Operation

Referring to FIGS. 27-31, in this example, a magnetically isolated phase interior permanent magnet electrical rotating machine is operating as a generator. An angular section of a stator 2702 and a rotor 2704 is shown with three stator phase sections 2706-2710 or segments (phase one 2706, phase two 2708, and phase three 2710) with two teeth per stator phase section. This simplified approach is used for the ease of illustrating and explaining the principles of the generator operation and does not necessarily represent a preferred embodiment.

Figure 32:
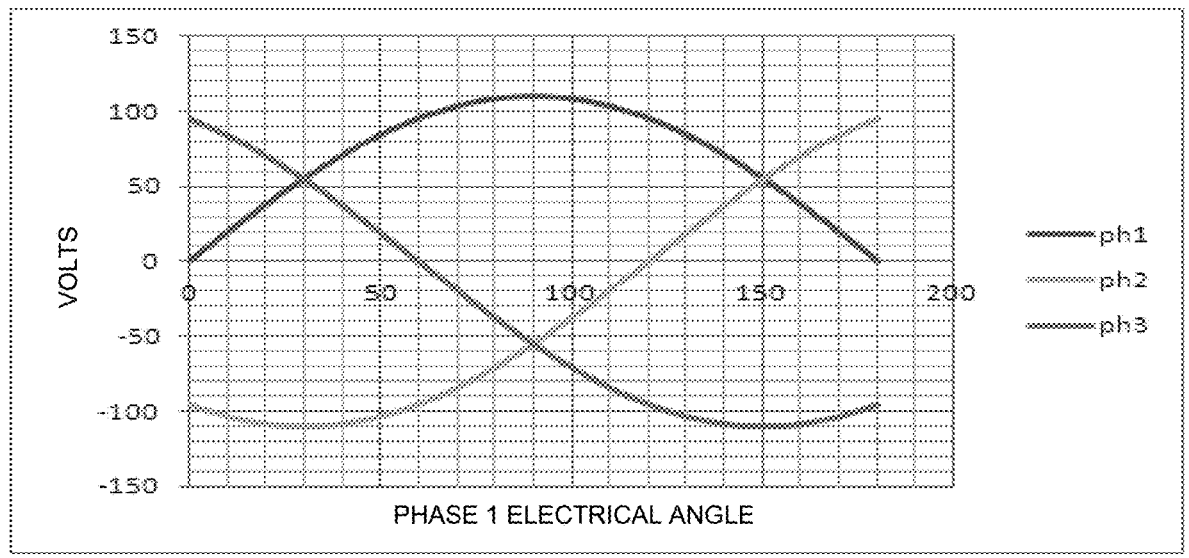

The rotor's initial angular position is with the phase 1 rotor and stator teeth in alignment and is at both zero electrical and 0 mechanical degrees (FIG. 27) and equally at zero on the axis of the voltage output graphs of FIG. 31 (phase 1 mechanical angle) and FIG. 32 (phase 1 electrical angle). In phase 2, the rotor poles are moving "out" of alignment by 2.4 mechanical degrees when phase 1 is at 0 mechanical degrees and is at −120 electrical degrees, as shown on the voltage output graphs of FIGS. 31-32. In phase 3, the rotor poles are moving "into" alignment by 4.8 mechanical degrees when phase 1 is at 0 mechanical degrees and is at 120 electrical degrees, as shown on the voltage output graphs of FIGS. 31-32.

The rotor is rotating counter-clockwise. At the point shown in FIG. 28, phase 1's stator and rotor teeth are moving out of alignment by 2.4 mechanical degrees and is at 60 electrical degrees in the voltage graphs of FIGS. 31-32. Phase 3's rotor and stator poles come into alignment and are at 0 mechanical degrees and at 0 electrical degrees in the voltage graphs of FIGS. 31-32. Phase 2 underwent a flux reversal as it passed through 3.6 mechanical degrees, and the next set of rotor teeth are now coming into alignment with its stator teeth and are at 4.8 mechanical degrees and at −60 electrical degrees, as shown on the voltage graphs of FIGS. 31-32.

As the rotor continues rotating counter-clockwise, and at the point shown in FIG. 29, Phase 1 underwent a flux reversal as it passed through 3.6 mechanical degrees, and the next set of rotor teeth are now coming into alignment with its stator teeth and are at 4.8 mechanical degrees and is at 120 electrical degrees in the voltage graphs of FIGS. 31-32. Phase 2's rotor and stator poles come into alignment and are at 0 mechanical degrees and at 0 electrical degrees in the voltage graphs of FIGS. 31-32. Phase 3 rotor and stator teeth are now moving out of alignment by 2.4 mechanical degrees and are now at −60 electrical degrees on the voltage graphs of FIGS. 31-32.

As the rotor continues rotating counter-clockwise, and at the point shown in FIG. 30, all of the phases return the same mechanical degrees as shown in FIG. 27. Phase 1 is at 0 mechanical degrees, phase 2 is at 2.4 mechanical degrees, and phase 3 is at 4.8 mechanical degrees. The difference between FIG. 27 and FIG. 30 is that the flux has reversed through all of the phase windings and the electrical degrees for each of the phases, which are phase 1: 0 electrical degrees, phase 2: 120 electrical degrees, and phase 3: −120 electrical degrees, as shown in the voltage graphs of FIGS. 31-32.

The induced voltage in an isolated phase interior permanent magnet electrical rotating machine operating as a generator follows Faraday's Law as with other generators.

$$E = N \cdot \frac{d\Phi}{dt} \qquad \text{Eq. 18}$$

Where N=the number of turns, dΦ=the change in flux (webers), and dt=time increment over which the change in flux occurs. In rotating machines, dt is typically replaced with seconds/radian.

Figure 33:
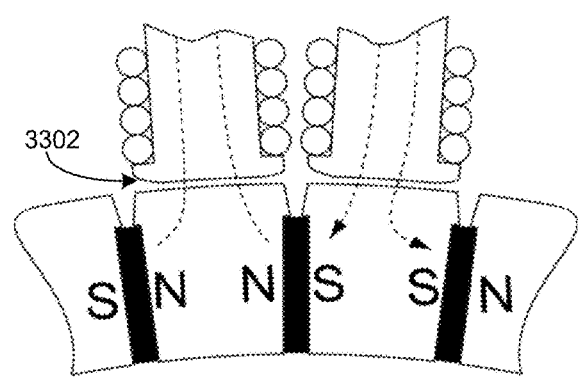
FIG. 33 is a diagram of a tip modified stator pole of a stator in a magnetically isolated phase interior permanent magnet electrical rotating machine.

The output waveform for a generator using the isolated phase interior permanent magnet electrical rotating machine topology can be tailored using pole shaping. For instance if the output waveform resembles a square wave, the poles may be shaped to more closely approximate a sine wave by removing material from the stator pole (tooth) tips to create a tip modified (shaved/removed) stator pole (tooth) 3302, or alternately the rotor pole tips, as depicted in FIG. 33.

Motoring Operation

With reference now to FIGS. 34-37, an example isolated phase interior permanent magnet electrical rotating machine 3402 operates as a motor. An angular section of a stator 3404 and a rotor 3406 is shown with three stator phase sections 3408-3412 or segments (phase one 3408, phase two 3410, and phase three 3412) with 2 teeth per stator phase section. This simplified approach is used for the ease of illustrating and explaining the principles of motor operation and does not necessarily represent a preferred embodiment.

Figures 34, 35:
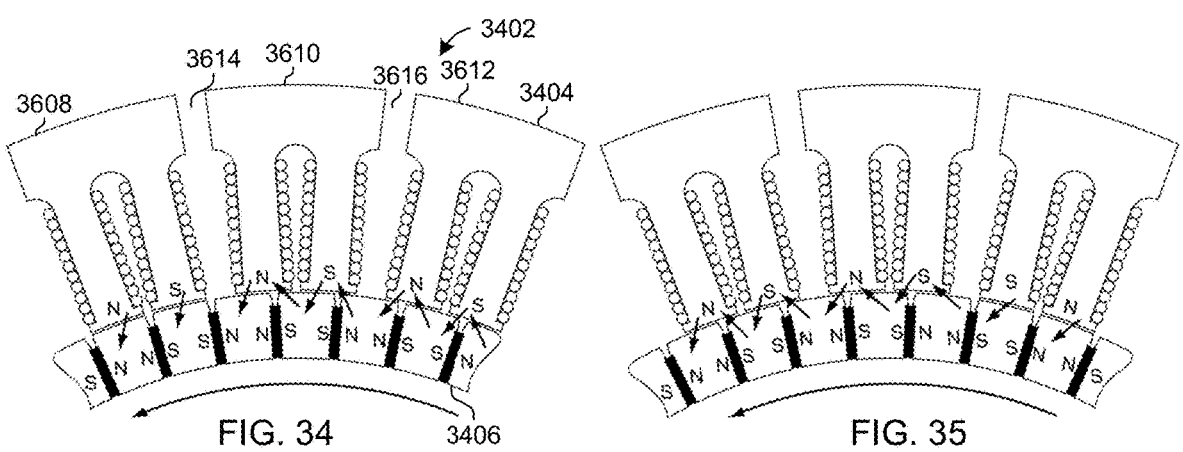
FIGS. 34-37 are diagrams of a motoring operation.

In FIG. 34, phase one's 3408 stator teeth are aligned with rotor teeth, phase two's 3410 stator teeth are offset by 2.4 degrees from the "leading" rotor teeth, and phase three 3412 is offset 2.4 degrees from the "trailing" rotor teeth, assuming a counter-clockwise rotating rotor 3604. In this rotor position, the coils in the motor's phases (wound on the teeth) are energized to produce the polarities shown. The forces acting on the rotor 3406 at this position are due to the coils being energized and producing a magnetic flux that either repels or attracts a rotor segment due to the flux from a permanent magnet traversing through the rotor segment. The flux produced by the phase 1 coil will be repelling the aligned rotor segments, the flux produced by the coils in phase 2 and phase 3 will repel the "leading" rotor segments and attract the "trailing" rotor segments. The sum of the forces acting on the rotor will rotate the rotor 3406 in a counter-clockwise direction.

As the rotor 3406 rotates in a counter-clockwise direction once the rotor has moved an angular distance of 2.4 degrees, FIG. 35, the rotor poles will move out of alignment with phase 1's rotor teeth, the rotor poles will advance 2.4 degrees with respect to phase 2's stator teeth, and the rotor poles will move into alignment with phase 3's stator teeth. The current through the coils wound on phase 3's stator teeth is reversed, which in turn reverses the magnetic polarities on phase 3's rotor teeth to repel the aligned rotor teeth supporting rotor rotation in the counter-clockwise direction.

The rotor 3406 continues to rotate in a counter-clockwise direction. Once the rotor 3406 has advanced another 2.4 degrees, FIG. 36, the rotor poles come into alignment on phase 2. The current through the coils wound on phase 2's stator is reversed, which in turn reverses the magnetic polarities on phase 2's rotor teeth to repel the aligned rotor teeth supporting rotor rotation in the counter-clockwise direction.

Figures 36, 37:
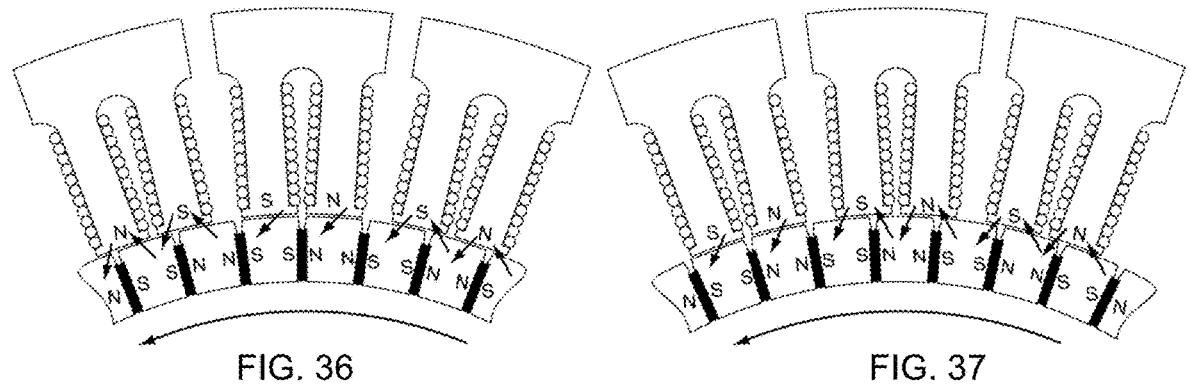

Once the rotor 3406 has advanced another 2.4 angular degrees, FIG. 37, the rotor poles move back into alignment with phase 1's stator teeth. The current through the coils wound on phase 1's stator teeth is reversed, which in turn reverses the magnetic polarities on phase 1's rotor teeth to repel the aligned rotor teeth supporting rotor rotation in the counter-clockwise direction.

This sequential switching of the coils wound on each of the phase's stator teeth will continue rotating the rotor in a counter-clockwise direction. Alternately, if the magnetic polarities were reversed on the phases 2 and 3 rotor teeth starting in the position shown in FIG. 34, the rotor would rotate in a clockwise direction. The sum of the magnetic forces produced on the rotor by the current in the phase coils will appear as torque on the motor's output shaft. Some advancement or retarding of the switching angle of 2.4 degrees can be performed to optimize performance due to the effects of inductances and back electromotive forces.

Figure 38:
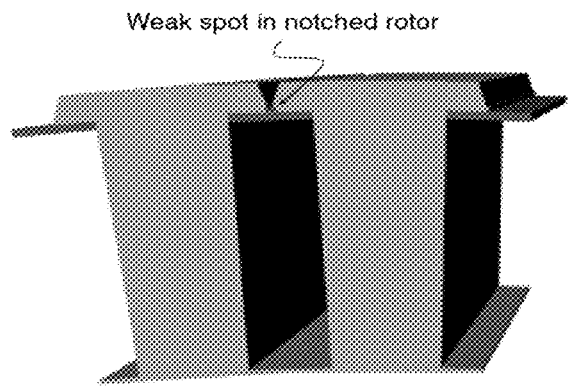
FIGS. 38-40 depict a rotor with an arch bridge connecting rotor pole sections between the permanent magnets.
Figure 39:
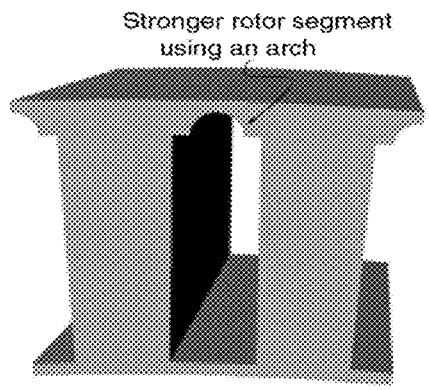
Figure 40:
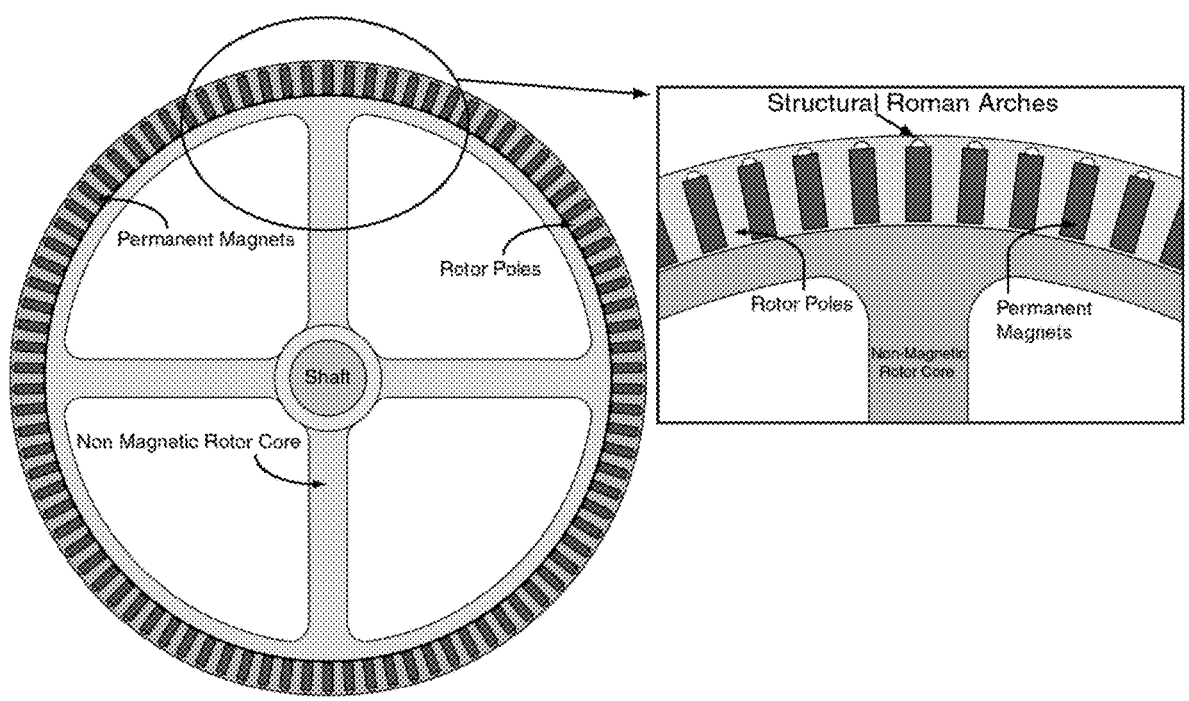

In one embodiment, as depicted in FIGS. 38-40, the rotor has a bridge connecting rotor pole sections between the permanent magnets. The bridge in this embodiment is configured as or with an internal arch or other arch. The arch eliminates a weak mechanical spot from rotor having a notch at the bridge connecting rotor pole sections between the permanent magnets.

The arch eliminates the need to insert additional non-magnetic laminates, significantly reducing part count, cost, and manufacturing process requirements.

The arch reduces windage (and the accompanying noise) that is intrinsic to conventional rotor-stator interfaces by creating a smooth surface on the rotor. This also reduces drag and increases efficiency. Since windage losses increase as a function of speed, the arch provides a significant advantage during higher speed and variable speed operation.

The arch reduces cogging forces without the need for skewing the laminations on either the rotor or the stator. This also reduces drag and increases efficiency.

Those skilled in the art will appreciate that variations from the specific embodiments disclosed above are contemplated by the invention. The invention should not be restricted to the above embodiments, but should be measured by the following claims.

What is claimed is:

1. A system comprising:
    a rotor for a machine comprising a plurality of rotor segments, each rotor segment forming at least one rotor pole and having a plurality of permanent magnets interior to the rotor and at least one saturatable bridge section for each permanent magnet in the rotor segment, each saturatable bridge section comprising a protrusion between air regions separating a north pole and a south pole of the permanent magnet to cause a portion of magnetic flux from the permanent magnet to traverse the saturatable bridge and cause a majority of the permanent magnet flux through an air gap of a rotor-stator interface between the rotor and a stator of the machine and through a stator pole.

2. The system of claim 1 wherein at least two stator teeth each define one stator pole and each have a phase winding.

3. The system of claim 1 wherein a total number of rotor poles in the rotor is divisible by two or a multiple of two.

4. The system of claim 1 wherein the plurality of permanent magnets of each rotor segment comprises at least two permanent magnets arranged in parallel with opposing magnetic poles in which a magnetic pole of one permanent magnet faces a same magnetic pole of another permanent magnet to direct magnetic flux through a corresponding rotor pole, through the air gap of the rotor-stator interface, and through a corresponding stator pole.

5. The system of claim 1 wherein the machine comprises one of two electrical phases, three electrical phases, and four electrical phases.

6. The system of claim 1 wherein the machine comprises at least one of a generator, a motor, and an alternator.

7. The system of claim 1 further comprising the stator for the machine, the machine having a plurality of electrical phases, the stator comprising at least one stator phase section with at least two stator teeth and at least one winding slot having an angular distance between the at least two stator teeth and at least one magnetically inactive isolation region having an angular distance equal to the at least one winding slot angular distance multiplied by a reciprocal of a number of the electrical phases.

8. A system comprising:
    a stator for a machine having a plurality of electrical phases, the stator comprising at least one stator phase section with at least two stator teeth and at least one winding slot having an angular distance between the at least two stator teeth; and
    a rotor comprising a plurality of rotor segments, each rotor segment forming at least one rotor pole and having a plurality of permanent magnets interior to the rotor and at least one saturatable bridge section for each permanent magnet in the rotor segment, each saturatable bridge section comprising a protrusion between air regions separating a north pole and a south pole of the permanent magnet to cause a portion of magnetic flux from the permanent magnet flux from at least one rotor permanent magnet to traverse the saturatable bridge and cause a majority of the permanent magnet flux through an air gap of a rotor-stator interface between the rotor and the stator of the machine and through a stator pole.

9. The system of claim 8 wherein the bridge segment comprises a structural arch.

10. The system of claim 8 wherein the at least two stator teeth of the at least one stator phase section comprises an even number of stator teeth.

11. The system of claim 8 wherein the plurality of permanent magnets of each rotor segment comprises at least two permanent magnets arranged in parallel with opposing magnetic poles in which a magnetic pole of one permanent magnet faces a same magnetic pole of another permanent magnet to direct magnetic flux through a corresponding rotor pole, through the air gap of the rotor-stator interface, and through a corresponding stator pole.

12. The system of claim 8 wherein the stator comprises at least one magnetically inactive isolation region.

13. The system of claim 12 wherein a permanent magnet field comprises flux from a rotor permanent magnet, and the magnetically inactive isolation region is dimensioned to prevent at least some of the flux from the rotor permanent magnet from being shared from the stator phase section to another stator phase section.

14. The system of claim 12 wherein a permanent magnet field comprises flux from a rotor permanent magnet, and the magnetically inactive isolation region is dimensioned to reduce the flux from the rotor permanent magnet from being shared between the stator phase section and another stator phase section.

15. The system of claim 8 wherein a stator tooth defines a stator pole, a total number of rotor poles in the rotor is equal to 360 degrees divided by a first quantity of a number of degrees per stator phase section divided by a second quantity of a number of stator poles per stator phase section plus the reciprocal of the number of the electrical phases $$\left( \text{no. rotor poles} = \frac{360 \text{ degrees}}{\frac{\text{no. degrees per stator phase section}}{\text{no. of stator poles per stator phase section} + \frac{1}{\text{no. of } electical \text{ phases}}}} \right).$$

16. The system of claim 1 wherein each rotor segment has two saturatable bridge sections for each permanent magnet in the rotor segment.

17. The system of claim 16 wherein the two saturatable bridge sections for each permanent magnet are on opposite sides of the permanent magnet.

18. The system of claim 8 wherein each rotor segment has two saturatable bridge sections for each permanent magnet in the rotor segment.

19. The system of claim 18 wherein the two saturatable bridge sections for each permanent magnet are on opposite sides of the permanent magnet.

\* \* \* \* \*